Figure 1:
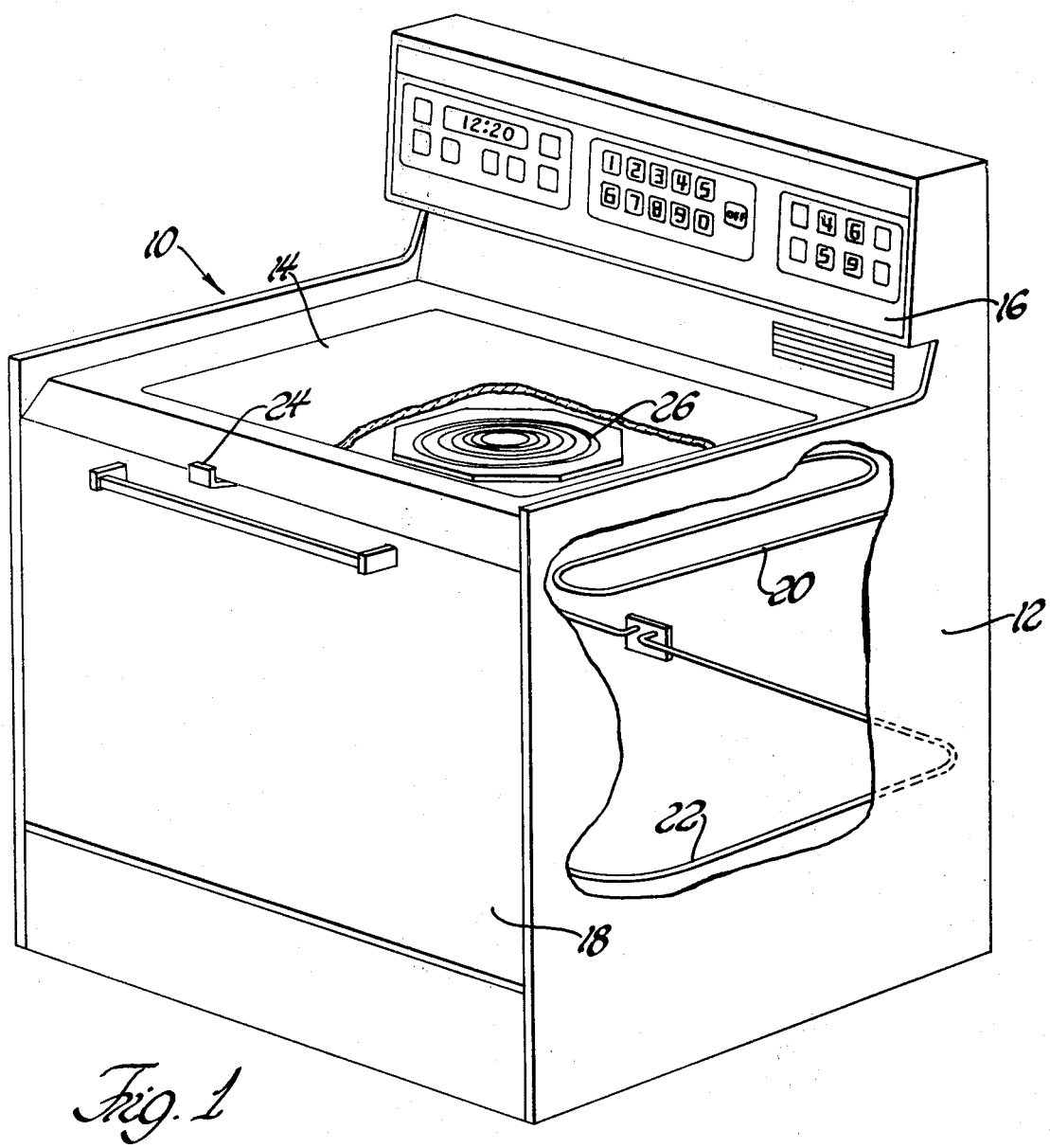

United States Patent [19]

Gould, Jr.

[11] 3,974,472
[45] Aug. 10, 1976

[54] DOMESTIC APPLIANCE CONTROL AND DISPLAY PANEL

[75] Inventor: Robert R. Gould, Jr., Xenia, Ohio

[73] Assignee: General Motors Corporation, Detroit, Mich.

[22] Filed: May 5, 1975

[21] Appl. No.: 574,513

Related U.S. Application Data

[62] Division of Ser. No. 457,760, April 4, 1974, Pat. No. 3,886,539, which is a division of Ser. No. 318,172, Dec. 26, 1972, Pat. No. 3,819,906.

[52] U.S. Cl............................ 340/337; 200/DIG. 1; 219/506; 307/116; 317/DIG. 2; 340/365 C
[51] Int. Cl.².......................................... G08B 5/36
[58] Field of Search...................... 340/337, 365 C; 200/DIG. 1; 317/DIG. 2; 307/116

[56] References Cited
UNITED STATES PATENTS

| 3,244,369 | 4/1966 | Nassimbene | 340/365 C |
|---|---|---|---|
| 3,382,588 | 5/1968 | Serrell et al. | 340/365 C |
| 3,482,241 | 12/1969 | Johnson | 340/365 C |
| 3,492,440 | 1/1970 | Cerbone et al. | 340/365 C |
| 3,691,555 | 9/1972 | Looschen | 340/365 C |
| 3,696,409 | 10/1972 | Braaten | 340/324 A |
| 3,757,322 | 9/1973 | Barkan et al. | 340/365 C |
| 3,772,685 | 11/1973 | Masi | 340/365 C |
| 3,846,791 | 11/1974 | Foster | 340/365 C |

Primary Examiner—David L. Trafton
Attorney, Agent, or Firm—Albert F. Duke

[57] ABSTRACT

A domestic range including a touch control and display panel and digital control logic for energizing power circuits controlling the various range heater elements in response to a program entered by the user by touching certain areas of the panel. The control logic also controls the displays located behind the panel to provide feedback to the user of the program selected.

7 Claims, 21 Drawing Figures

DOMESTIC APPLIANCE CONTROL AND DISPLAY PANEL

This is a Division of U.S. Ser. No. 457,760, filed Apr. 4, 1974, now U.S. Pat. No. 3,886,539 which is a Division of U.S. Ser. No. 318,172, now U.S. Pat. No. 3,819,906.

This invention relates to a domestic range for household cooking and more particularly, to such a range incorporating digital control and display panel means.

Prior art domestic ranges have generally included a control console with buttons and knobs protruding therefrom for operating switches and other control elements. These mechanical switches and actuators are subject to wear and may require repair or replacement within the normal life of the range. In addition, the prior art consoles included numerous openings to accommodate the actuator shafts for such switches and control elements. The openings permitted cooking grease and steam to penetrate within the control console clouding the glass panes associated with such consoles. This invention is directed to a domestic range which obviates these and other problems.

Accordingly, it is an object of this invention to provide a domestic range including a digital control and display console for selecting a program for the range heaters and further including digital control logic for controlling the heaters and the displays for visual feedback to the user of the program selected.

Another object of this invention is to provide a domestic appliance control panel having an imperforate glass pane coextensive therewith and including thereon address pads to provide for programming of the appliance in response to the capacitive effect of a user's touch, and including electronic display means for indicating the program status of the appliance.

A further object is the provision of a domestic oven heater control console having user's touch control for selecting oven function, temperature, and start and stop times to program the oven heaters, a display for visual feedback of the temperature and times selected and digital logic means limiting the time interval during which the user must complete each digit entry of his temperature and time selection, and limiting the number of digits which may be entered depending on the function selected.

A further object is the provision of a domestic oven heater control console having user's touch control for selecting oven function and oven temperature to program the oven heater, a display for visual feedback of the oven temperature selected and digital logic means preventing operation of the oven at temperatures outside a range of temperature predetermined by the logic means for the function selected.

Another object of this invention is the provision of a domestic appliance panel with digital logic means and user's touch control for programming the appliance in accordance with a user's preselection from a plurality of operating functions, said domestic appliance panel having a display normally displaying time of day and said logic means including means to disable the display of time of day and to enable the display of a number representing a selected time setting for the function selected.

Figure 2:
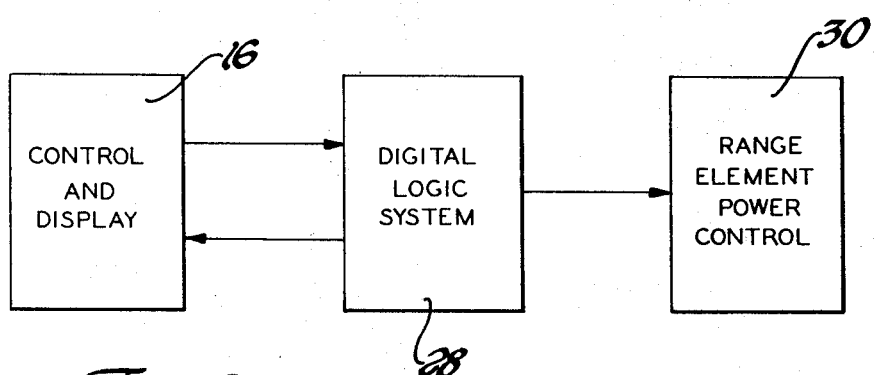
Figure 3:
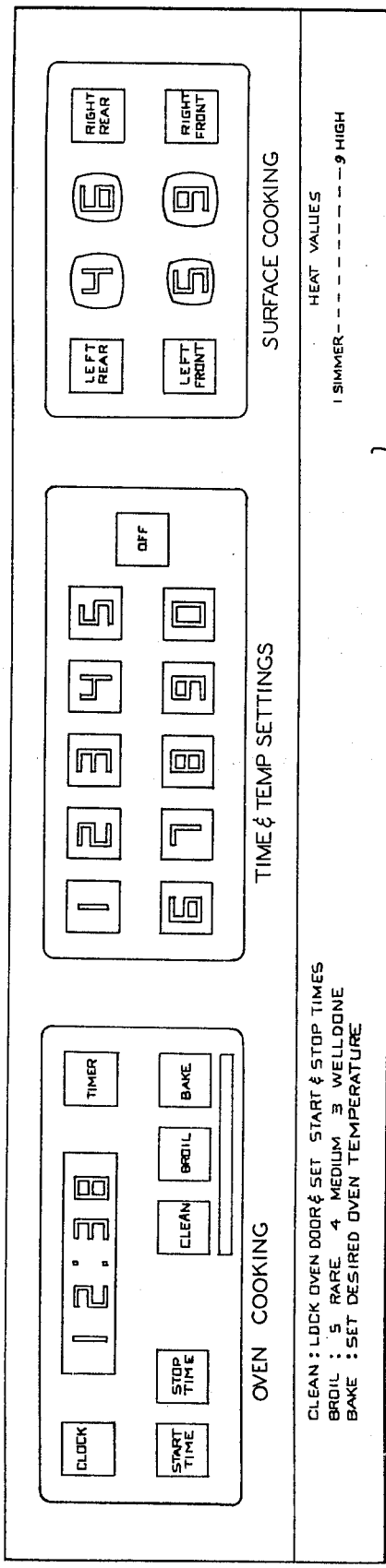
Figure 3A:
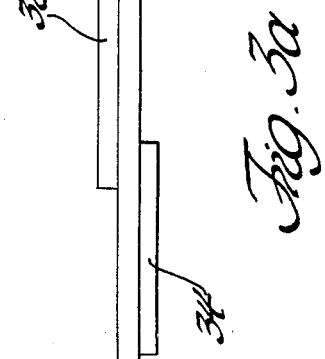
Figure 3B:
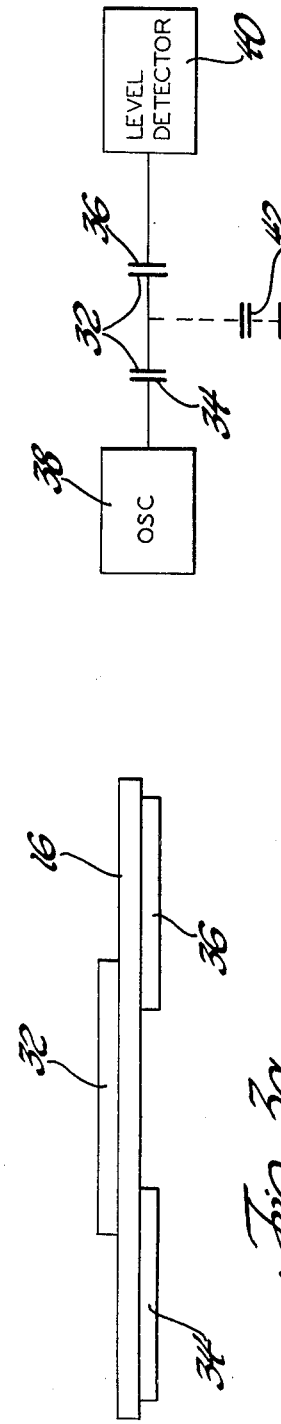
Figure 4:
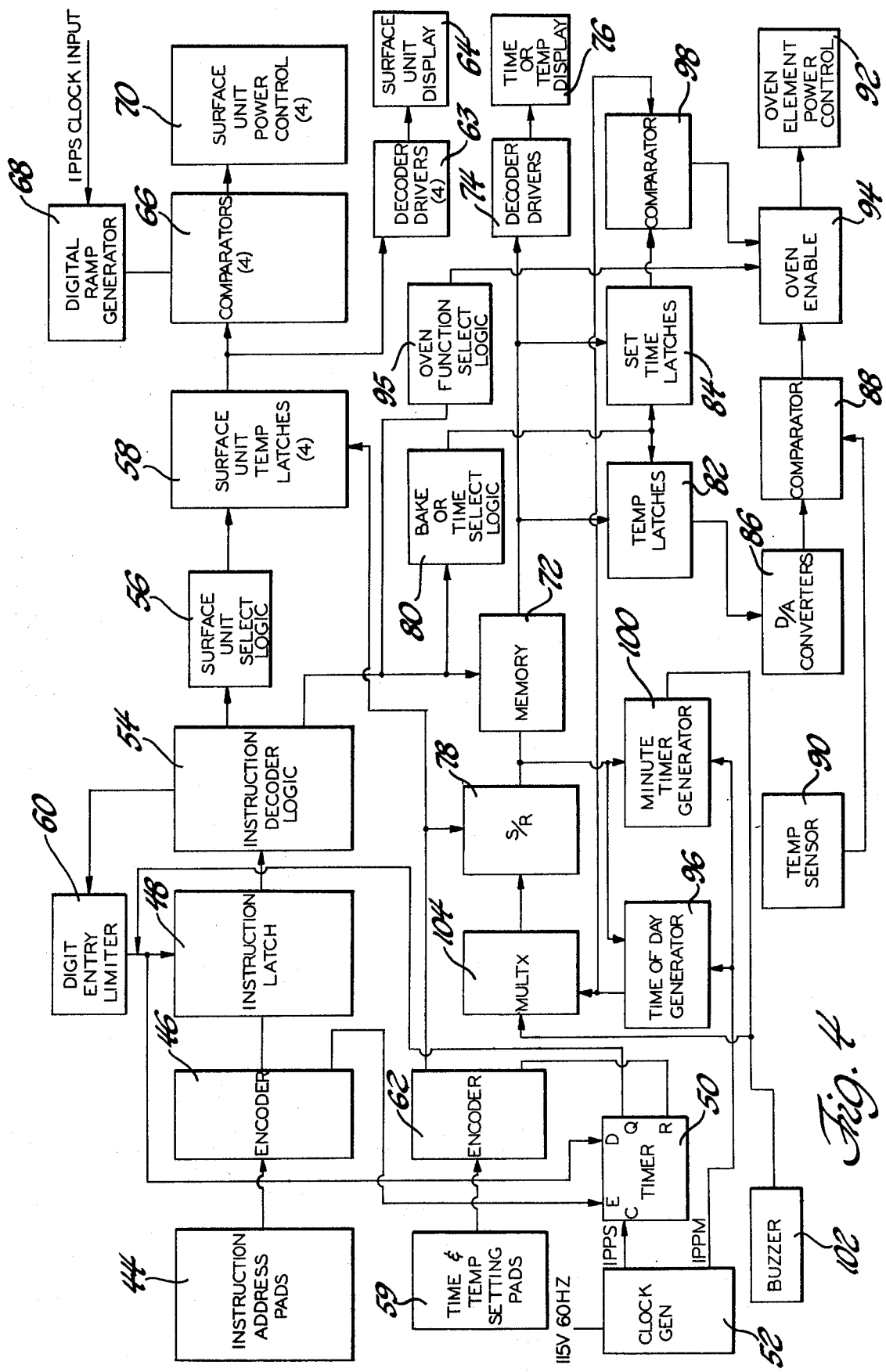
Figure 16:
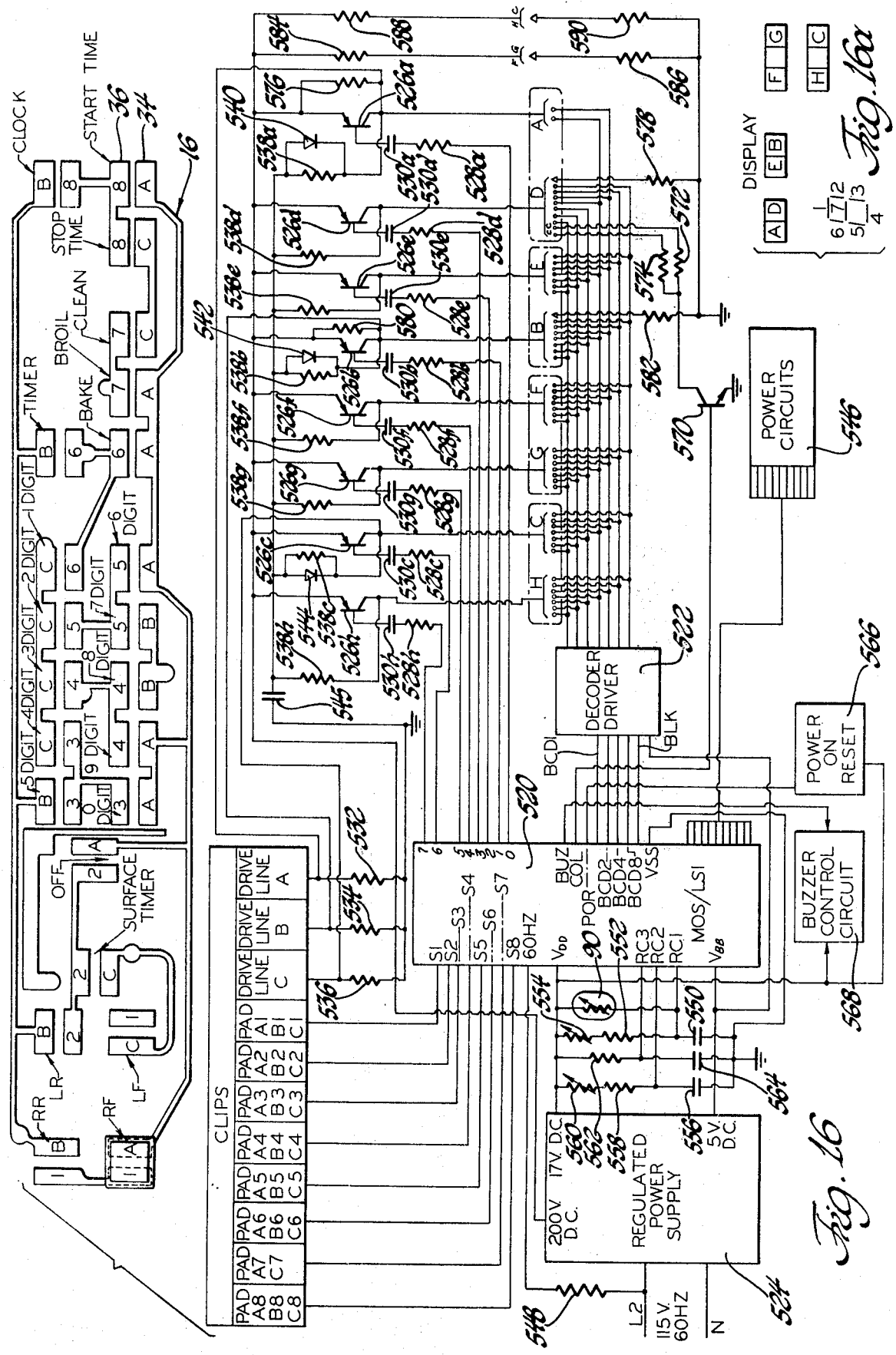
Figure 17:
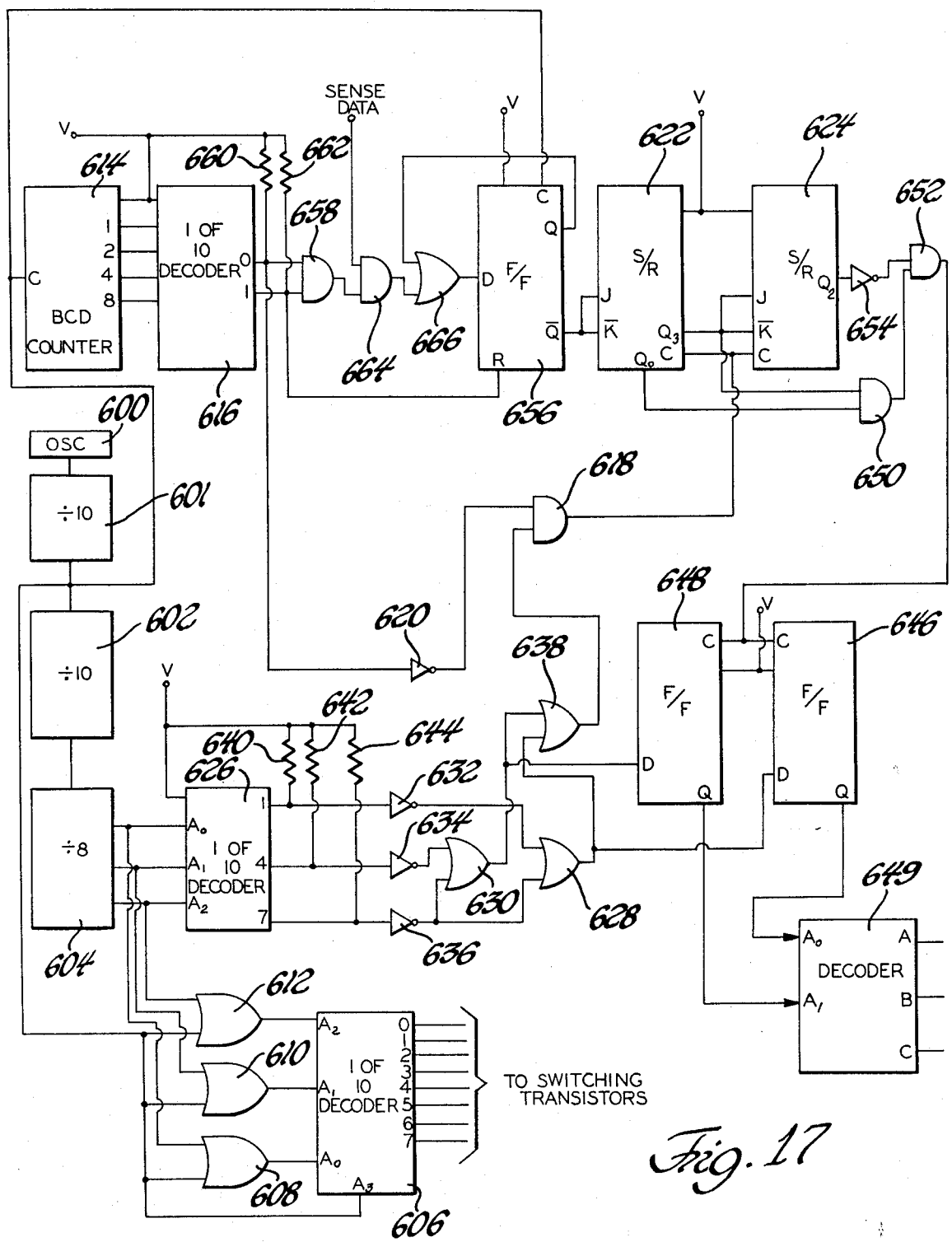
Figure 18:
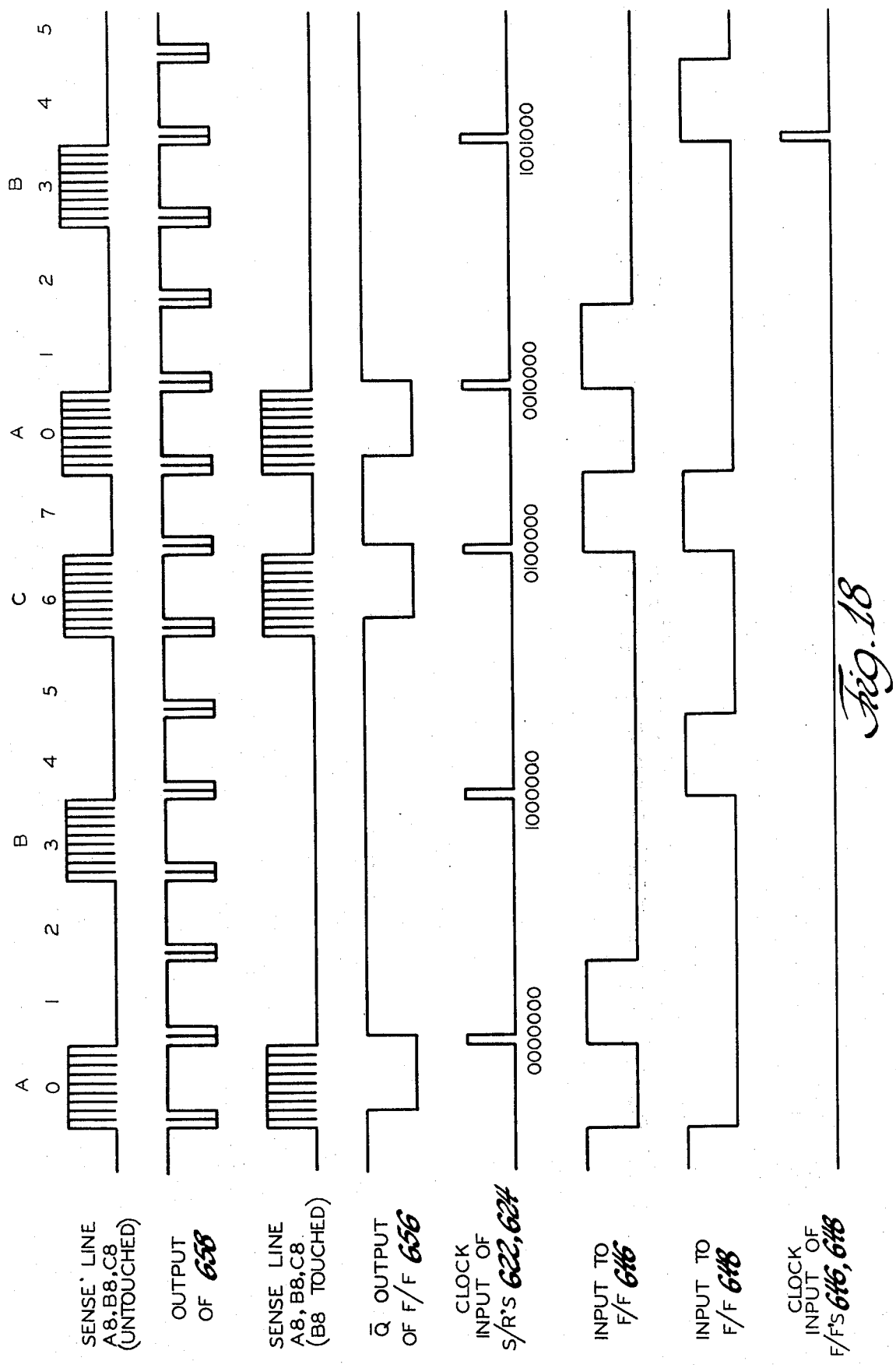

Other objects and advantages of the present invention will be apparent from the following detailed description which should be read in conjunction with the drawings in which:

FIG. 1 is a perspective view of the range;
FIG. 2 is a block diagram of the digital control and display system of the present invention;
FIG. 3 is an enlarged view of the control panel of the range;
FIG. 3a is a cross-section of one of the touch control address pads on the panel of FIG. 3;
FIG. 3b is a schematic diagram of the circuit for detecting touch of one of the address pads on the panel;
FIG. 4 is a more detailed block diagram of the system of the present invention;
FIGS. 5–15 are more detailed logic diagrams of the system of the present invention;
FIGS. 16–18 illustrate another embodiment of the invention.

Referring now to the drawings and initially to FIG. 1, an electric range generally designated 10 includes an upstanding substantially box-like metal body 12 having a substantially horizontal ceramic glass cooking top 14. An upstanding control and display panel 16 formed of tempered glass is located at the rear of the cooking top 14. An oven door 18 provides access to an oven cooking area containing a BROIL heating element 20 located at the top of the oven and a BAKE heating element 22 located at the bottom of the oven. An actuator 24 is provided for actuating an oven door locking mechanism (not shown) during an oven cleaning mode of operation. The surface cooking area contains four heating elements located at the right rear, left rear, right front, and left front positions. Only the right front surface heating element is shown in FIG. 1 and is designated by the numeral 26.

Referring now to FIG. 2, the panel 16 provides control information to a digital logic system generally designated 28 which controls the application of power to the various range heating elements generally designated 30 and also provides display information to the panel 16.

Referring now to FIG. 3, the control and display panel 16 includes a rectangular area entitled Surface Cooking at the right end of the panel consisting of four address pads corresponding to the respective surface units in the same relative position as they are located on the top of the range. The address pads are respectively designated RIGHT REAR, LEFT REAR, RIGHT FRONT, and LEFT FRONT. Adjacent each address pad is a display for that pad for displaying digits from 1–9 corresponding to various heat values from SIMMER to HIGH.

In the approximate center of the control and display panel 16 is a rectangular area entitled Time and Temperature Setting comprising a keyboard consisting of two rows of five digit pads with values of 1–5 displayed on the top row and 6–9 and 0 on the bottom row. On the right end of the two rows is an eleventh pad designated OFF.

At the left end of the panel 16 a rectangular area, entitled Oven Cooking, includes a display located between an address pad entitled CLOCK and an address pad entitled TIMER. The display provides a colon between the second and third digits when the display is indicating the time of day. The oven control address pads are located beneath the digit display and are respectively designated START TIME, STOP TIME, CLEAN, BROIL, and BAKE.

Referring now to FIGS. 3a and 3b, a conductive pad 32 is provided on the user's side of the glass panel 16 corresponding to each of the individual address pad locations as designated in FIG. 3. On the rear of the panel 16 additional conductive pads 34 and 36 are associated with each of the pads 32. As shown in FIG. 3b, an oscillator 38 and a level detector 40 are connected respectively with the conductive pads 34 and 36. When the conductive pad 32 is untouched the level detector 40 provides a high or logic 1 level output. When the conductive pad 32 is touched, additional capacitance designated 42 is introduced into the circuit between ground and the junction between the two capacitors formed by the conductive pads 32, 34, and 32, 36. When the capacitance 42 is introduced into the circuit the input to the level detector 40 from the oscillator 38 is greatly attenuated producing a low or logic level 0 output from the detector 40. A level detector such as the detector 40 is provided for each address pad location on the panel 16. Preferably, a single oscillator is provided for the entire panel and is connected with the interconnected conductive pads 34 of each address pad.

Referring now to FIG. 4, the instruction address pads, collectively designated 44, corresponding to the various instructions which may be entered from the Surface Cooking area or the Oven Cooking area of the display panel 16 are connected with an encoder 46 which generates a binary coded decial (BCD) instruction which is stored in an instruction latch 48. An instruction input also enables an 8 second timer 50 which receives a 1 PPS signal from a clock generator 52 connected with the 115 volt 60 Hz. domestic supply. The timer 50 resets the instruction latch 48 after 8 seconds if no further entry is made. The instruction held in the latch 48 is decoded by instruction decoder logic 54. If the instruction relates to one of the four surface units, surface unit select logic 56 enables one of four surface unit temperature setting latches 58 depending on which of the four surface units were selected by the user. The particular temperature setting for the surface unit is entered from the Time and Temperature Setting pads collectively designated 59 and is encoded by an encoder 62 to provide BCD data to the particular surface unit latch 58 enabled from the select logic 56. Entry of a digit resets the 8 second timer 50 so that the instruction is retained in the latch 48 as long as digit entries are made within an 8 second interval. A digit entry limiter 60 is programmed from the instruction decoder 54 to clear the instruction latch 48 and disable the timer 50 after the number of digits allowed for a particular instruction has been entered. In the case of a surface unit instruction the limiter 60 resets the latch 48 after a single digit has been entered.

The BCD data stored in the enabled latch 58 is fed to the corresponding one of four decode and display drivers 63 where the data is decoded and the corresponding surface unit display 64 adjacent the surface unit address pad selected is driven to display the digit entered. The data stored in latch 58 is also fed to a corresponding one of four comparators 66 where it is compared with the output of a digital ramp generator 68 to control energization of the corresponding one of four power control circuits 70. The selected surface unit is energized a proportional amount of time depending on the setting entered.

If an oven or time function is selected, a particular location in a memory unit 72 is addressed and the data in the memory location is decoded by a decode and display driver 74 and is displayed on the digit display 76 for viewing by the operator. If the operator desires to enter new data relating to time or temperature the BCD equivalent thereof is entered serially through a universal shift register 78 into the memory location addressed and is displayed to the user as entered. Select logic 80 controls a temperature latch 82 and set time latches 84 so that a BAKE temperature and a START TIME and STOP TIME entry are stored. If a temperature is entered the instruction stored in the latch 48 is cleared by the digit entry limiter 60 which is programmed to reset the latch 48 after three digits are entered. The data stored in the latch 82 is converted to analog data by a D/A converter 86 and is compared in a comparator 88 with the output of a temperature sensor 90 located in the oven. The power control 92 for the oven elements is enabled through oven enable logic 94. The oven elements are enabled whenever the temperature of the oven drops below the desired setting but for different percentages of time depending on the oven function selected as controlled by select logic 95. The data stored in the latches 84 is compared with the data in a time of day generator 96 by a comparator 98 so that the oven elements are enabled at the START TIME entered and disabled at the STOP TIME entered.

If a time of day entry is made it is stored in the time of day generator 96 which is incremented from the one pulse per minute output of the clock generator 52. The time of day may be entered into the generator 96 by touching the CLOCK address pad and entering the BCD equivalent of the time setting through the shift register 78. The digit entry limiter 60 is programmed by the decoder 54 to respond to a four digit entry and upon entry of the four digits resets the instruction latch 48.

The TIMER address pad controls a minute timer generator 100 which is decremented from the one pulse per minute output of the clock generator 52. A desired interval of time may be entered into the generator 100 by touching the TIMER address pad and thereafter touching the appropriate digits in the Time and Temperature Setting keyboard. When the time entered has elapsed, a buzzer 102 is energized. The buzzer may be deenergized by once again touching the TIMER pad and then touching the OFF address pad. The outputs of the generators 96 and 100 are connected with a multiplexer 104 and the data in the generators 96 or 100 is parallel entered into the memory 72 through the universal shift register 78 and displayed to the operator whenever the CLOCK or TIMER address pads respectively are touched.

Figure 5:
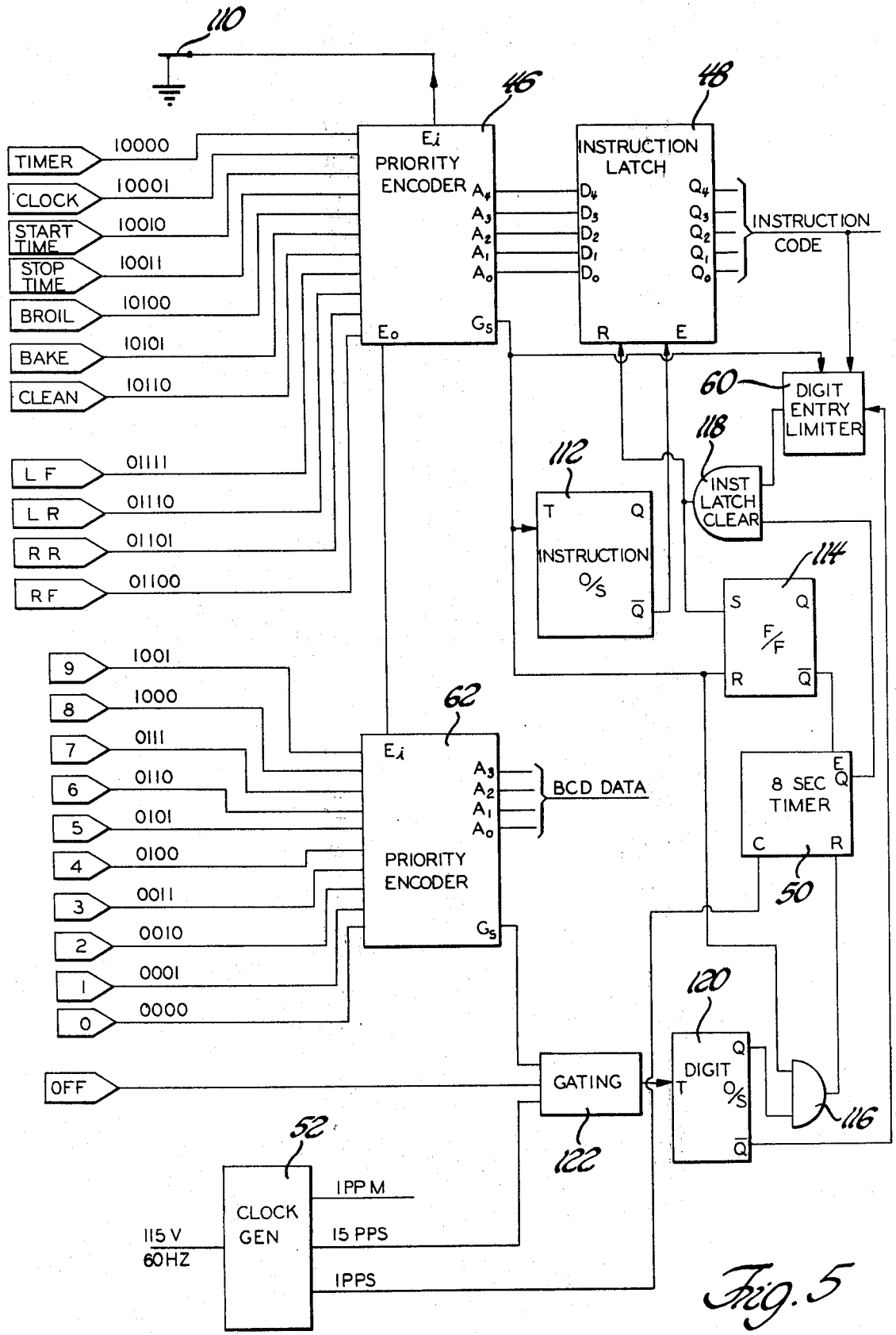

Referring now to the more detailed logic diagrams as shown in FIGS. 5-15, and initially to FIG. 5, the various address pads are designated by the legends shown and the binary code assigned to each pad is indicated adjacent the pad. The surface unit and oven cooking address pads each provide separate inputs to the priority encoder 46 which is normally enabled but which may be disabled by actuating a conveniently located panel disable switch 110. When any one of the various instruction address pads are touched, a low logic level appears at the output of the respective level detector 40, and the code for that particular instruction appears at the $A_0$-$A_4$ outputs of the encoder 46. The most significant bit of the code appears at $A_4$ and the least significant bit of the code appears at $A_0$. The outputs of the encoder 46 are connected with the $D_0$-$D_4$ inputs respectively of the instruction latch 48. The $G_s$ output of the encoder 46, which goes low when an instruction address pad is touched, triggers an instruction one-shot 112. When the one-shot 112 is triggered its $\bar{Q}$ output goes high to enable the instruction latch 48 so that the output of the encoder 46 appears at the output of the latch 48. After a short delay the $\bar{Q}$ output of the one-shot 112 returns low to store the instruction code at the $Q_0$–$Q_4$ outputs thereof. The $G_s$ output of the encoder also resets a flip-flop 114 to enable the timer 50 and through an AND gate 116 resets the timer 50. The timer 50 is clocked from the one pulse per second output of the clock generator 52 and after 8 seconds its $\bar{Q}$ output goes low to reset the latch 48 through an AND gate 118 designated INSTRUCTION LATCH CLEAR. The low going output of the gate 118 also sets the flip-flop 114 thereby disabling the timer 50.

The digits address pad identified by the numerals 1–9 and 0 are connected with the priority encoder 62 which provides at its $A_0$–$A_3$ outputs the binary coded decimal data listed adjacent the respective address pads. The group signal output $G_s$ of the encoder 62 goes low each time a digit address pad is touched to thereby trigger a digit one-shot 120 through gating 122 which will be disclosed in detail hereinafter. The gating 122 also receives inputs from the OFF address pad and clock generator 52. When the digit one-shot 120 is triggered its Q output goes low to thereby reset the timer 50 through the gate 116. Thus, unless the timer 50 is reset by a digit entry within 8 seconds after an instruction address pad or digit address pad is touched the instruction latch 48 will be reset to a condition where the output $Q_0$–$Q_4$ are all zeros. The digit entry limiter 60 produces a low output to reset the latch 48 through the gate 118 and disable the timer 50 through the gate 118 and flip-flop 114 after the assigned number of digits has been entered depending upon the particular instruction address pad touched. The limiter 60 will be described in detail hereinafter.

SURFACE UNIT CONTROL AND DISPLAY

Figure 6:
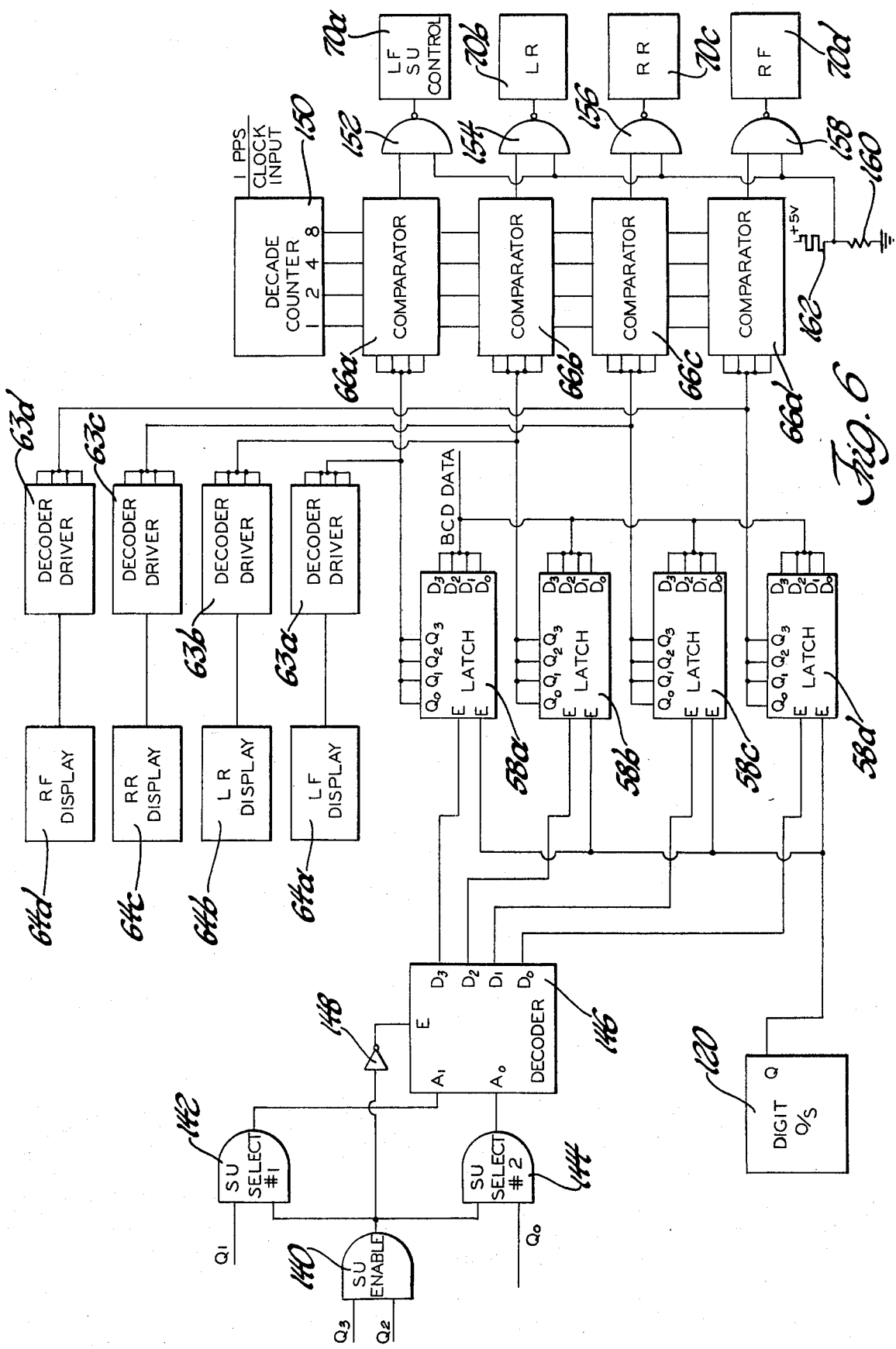

Referring now to FIG. 6, the instruction decode logic 54 includes an AND gate 140 connected with the $Q_2$ and $Q_3$ outputs of the latch 48 and designated SURFACE UNIT ENABLE. The output of the gate 140 provides inputs to AND gates 142 and 144 designated SURFACE UNIT SELECT No. 1 and No. 2 respectively. If any surface unit address pad is touched the $Q_2$ and $Q_3$ outputs of the latch 40 will both be logic 1 as may be seen from the codes listed adjacent the surface unit address pads. The other inputs to the gates 142 and 144 are respectively connected with the $Q_1$ and $Q_0$ outputs of the latch 48. Consequently, the outputs of the gates 142 and 144 will be respectively "00", "01", "10", or "11" depending upon whether the right front, right rear, left rear, or left front surface unit address pad is touched. The output of the gates 142 and 144 provide inputs to a one-of-four decoder 146 which is enabled from the output of the gate 140 through an inverter 148. The decoder 146 provides a low output to one of the enable inputs of one of the four latches 58a, 58b, 58c, or 58d, depending upon which of the four aforementioned two bit configurations are applied to the inputs of the decoder 146. The BCD equivalent of the temperature setting selected subsequent to the surface unit selection is entered into the appropriate one of the latches 58a–58d when the digit one-shot 120 is triggered and is stored therein when the one-shot returns to its stable state. The output of the latches 58a–58d are applied to respective decode drivers 63a–63d which control the displays 64a–64d, adjacent the surface unit address pads on the control and display panel 16. The data stored in the latches 58a–58d is also compared in comparators 66a–66d with the output of a decade counter 150 which functions as the digital ramp generator 68 (FIG. 4). The counter 150 is driven from the 1 PPS output of the clock generator 52. The output of the comparators 66a–66d provide one input to NAND gates 152–158 respectively. The other input to the gates 152–158 is from a glass top break detector circuit comprising a pull down resistor 160 and ribbon 162 connected between a high logic level and ground. The glass top break detector circuit provides a low input to disable the gates 152–158 in the event the glass top 14 on the range is broken. The output of each of the gates 152–158 provides inputs to the respective surface unit control circuits 70a–70d. The control circuits 70a–70d are conventional zero crossover detector circuits controlling the firing of a triac or other bidirectional switching device connected in the AC line to the heater element. The output of the comparators 66a–66d controls the particular surface unit selected in accordance with the setting in the latches 58a–58d. For example, if the right front surface unit address pad is touched, the two bit configuration "00" is applied to the $A_0$ and $A_1$ inputs of the decoder 146 causing its $D_0$ output to go low. The $D_1$, $D_2$, and $D_3$ outputs remain high. If the digit address pad corresponding to the digit 8 is touched the Q output of the digit one-shot 120 goes low and the BCD data enters the latch 58d and appears at its output. Data cannot enter the latches 58a–58c as long as the $D_1$–$D_3$ outputs of the decoder 146 are high. When the one-shot 106 times out, its Q output goes high to store the data in the latch 58d. The output of the latch 58d is decoded by the decode driver 62d which drives the display 64d to present the digit 8 to the user for verification. The output of the comparator 66d is high to energize the right front control circuit 70d and apply power to the right front surface unit 26 as long as the output of the decade counter 150 is less than the output of the latch 66d. The right front surface unit 26 is therefore energized for 80% of the time and deenergized for 20% of the time.

CONTROL LOGIC FOR OVEN TEMPERATURE AND TIME DISPLAY

Figure 7:
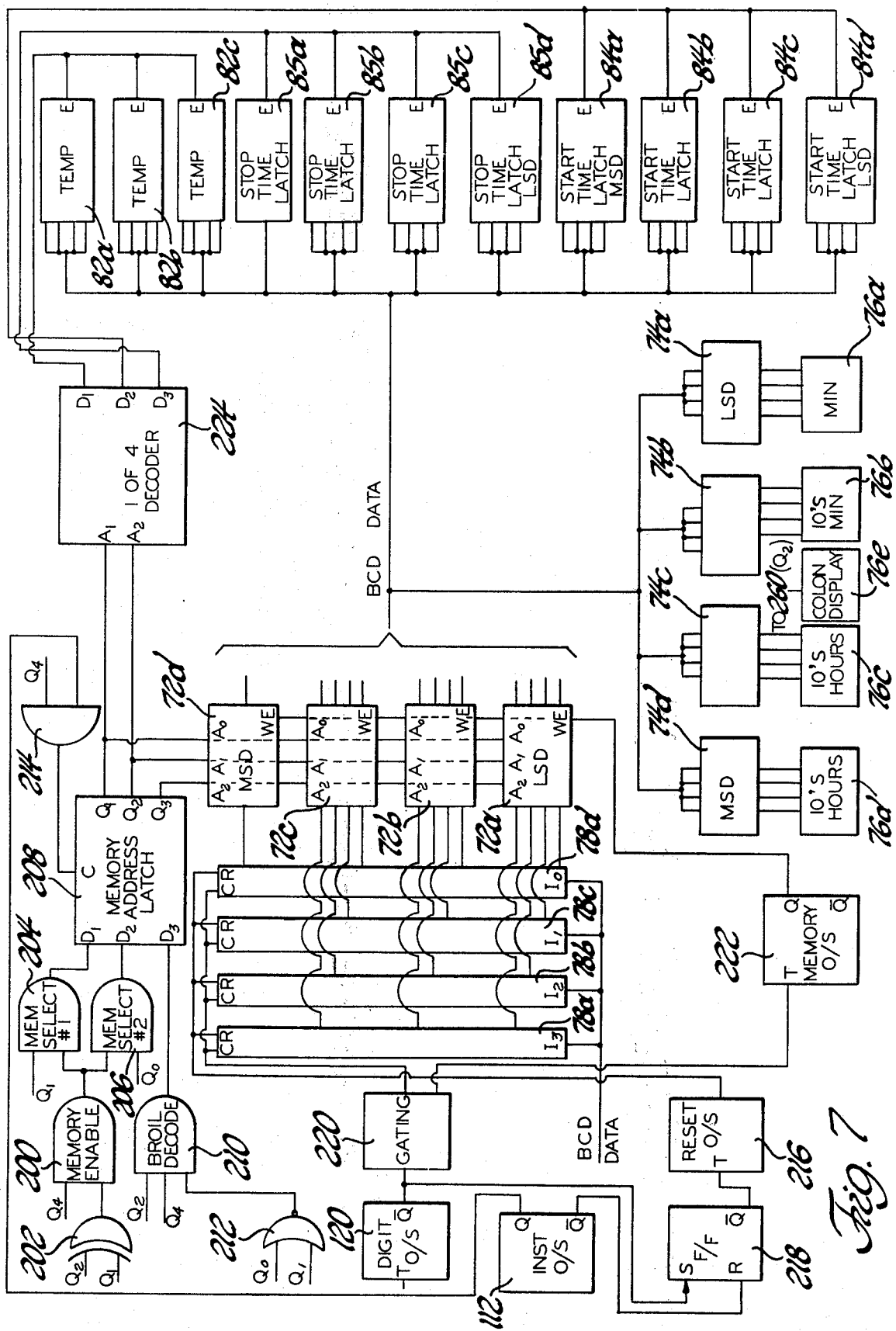

Referring now to FIG. 7, the instruction decode logic 54 further includes an AND gate 200 designated MEMORY ENABLE which has one input connected to the $Q_4$ output of the instruction latch 48 and the other input connected to $Q_1$ and $Q_2$ of the instruction latch 48 through an EXCLUSIVE OR gate 202. The output of the gate 200 provides one input to AND gates 204 and 206 designated MEMORY SELECT No. 1 and MEMORY SELECT No. 2 respectively. The other inputs to gates 204 and 206 are respectively, the $Q_1$ and $Q_0$ outputs of the latch 48. The outputs of the gates 204 and 206 are connected with the $D_1$ and $D_2$ inputs respectively of a memory address latch 208. The $D_3$ input to the latch 208 is connected with the output of a gate 210 designated BROIL DECODE. The gate 210 has inputs connected to the $Q_2$ and $Q_4$ outputs of the latch 48 and to the $Q_0$ and $Q_1$ outputs thereof through a NOR gate 212. Information present at the D inputs of the latch 208 is transferred to the Q outputs thereof when the clock input of the latch 208 is high and the Q outputs will follow the D inputs as long as the clock input remains high. When the clock goes low the information at the D inputs is retained at the Q outputs. The latch 208 is clocked from the output of an AND gate 214 having one input connected with the $Q_4$ output of the instruction latch 48 so that the gate 214 is enabled whenever an oven or time related address pad is touched. The other input to the gate 214 is from the $\overline{Q}$ output of the instruction one-shot 112. When the instruction one-shot 112 is triggered to its unstable state upon touching of one of the instruction address pads, its $\overline{Q}$ output goes high and the information at the D inputs of the latch 208 appear at the Q outputs thereof. When the instruction one-shot 112 returns to its stable state the latch 208 stores the memory location being addressed. The outputs $Q_1$, $Q_2$, and $Q_3$ of the latch 208 are connected respectively to the inputs $A_0$, $A_1$, and $A_2$ of each of the memory elements 72a–72d of the memory 72. One of four locations in the memory elements 72a–72d is addressed, namely, 01, 10, 11, or 100 depending upon whether the BAKE, START TIME, STOP TIME, or BROIL address pads are touched. The 00 location in the memory is utilized for other purposes as will be explained hereinafter.

Data is entered by the user into the addressed location in memory elements 72a–72d through universal shift registers 78a–78d which respectively store the four bits corresponding to each digit entered by the user. The memory elements 72a–72d are connected with respective decode drivers 74a–74d. As each digit is entered, the previous digit is shifted upward in shift registers 78a–78d and in the memory elements 72a–72d and are progressively decoded and displayed on the digit displays 76a–76d so that upon entry of the final digit the temperature setting or time setting entered by the user is displayed for verification.

The shift register 78 is reset from a one-shot 216 which is triggered from the digit one-shot 120 through a flip-flop 218. The flip-flop 218 is reset from the instruction one-shot 112. The shift register 78 is clocked from the digit one-shot 120 through gating 220 which will be described more fully hereinafter. The resetting of the shift register 78 occurs on the first digit entry following an instruction, while the digit one-shot 120 is in its unstable state. When the digit one-shot 120 returns to its stable state the shift registers 78 are clocked. A memory one-shot 222 is triggered from the digit one-shot 120 through the gating 220 to enable the WRITE ENABLE input to the memory elements 72a–72d so that the data from the shift register 78 may be written into memory.

The $Q_1$ and $Q_2$ outputs of the latch 208 provide inputs to a one-of-four decoder 224. The $D_1$ output of the decoder 224 goes low enabling the temperature latches 82a–82c when the output of the latch 208 is 01 indicative of the BAKE address pad having been touched. The $D_2$ output of the decoder 216 goes low enabling the START TIME latches 84a–84d when the output of the latch 208 is 10 indicative of the START TIME address pad having been touched. The $D_3$ output of the decoder 216 goes low enabling the STOP TIME latches 85a–85d when the output of the latch 208 is 11 indicative of the STOP TIME address pad having been touched. The latches 82a–82c, 84a–84b, and 85a–85d receive their inputs from the memory 72 depending on the particular location addressed and the data entered into the memory 72 through the shift register 78. The latches 82a–82c are connected only with the memory elements 72a–72c since only a three digit temperature setting is to be entered.

Figure 8:
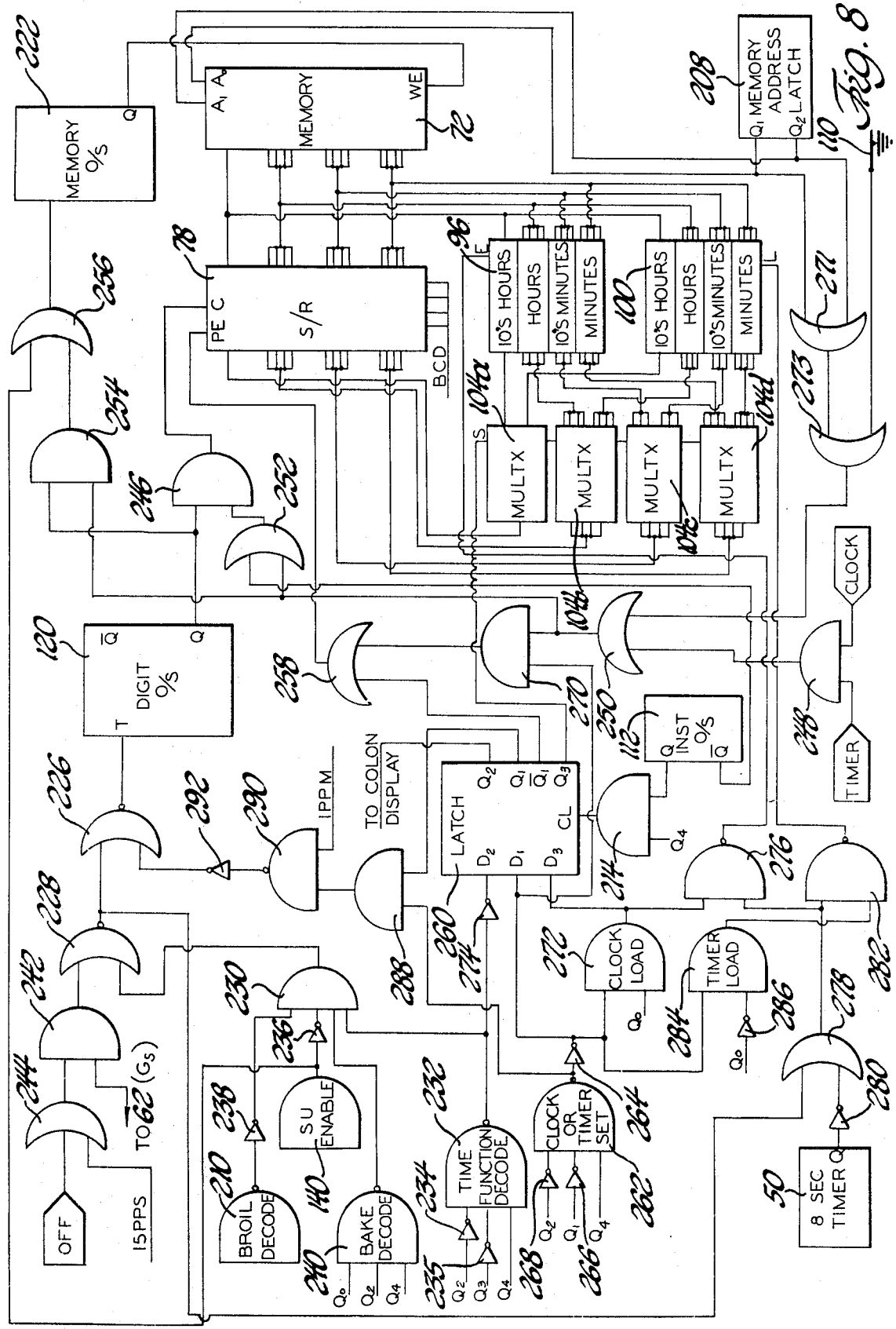

Referring now to FIG. 8, the digit one-shot 120 is triggered by touching any digit in the Time and Temperature Setting keyboard subsequent to touching an address pad in the Oven or Surface Unit Control area. To this end the previously alluded to gating 122 (FIG. 5) comprises a NOR gate 226 having its output connected with the trigger input of the digit one-shot 120. The gate 226 has one input connected with the output of a NOR gate 228. The gate 228 performs a logical AND function and has one input connected to the output of an AND gate 230. One input to the gate 230 is from a NAND gate 232 designated TIME FUNCTION DECODE. The inputs to the gate 232 are connected with the $Q_4$ output of the latch 48 and with the $Q_2$ and $Q_3$ outputs of the latch 48 through inverters 234 and 235. The output of the gate 232 goes low if either the TIMER, CLOCK, START TIME, or STOP TIME address pads are touched. A second input to the gate 230 is from the aforementioned SURFACE UNIT ENABLE gate 140 through an inverter 236. The output of the gate 140 goes high if any surface unit address pad is touched. A third input to the gate 230 is from the aforementioned BROIL DECODE gate 210 through an inverter 238. The output of the gate 210 goes high if the BROIL address pad is touched. The fourth input to the gate 230 is from a NAND gate 240 designated BAKE DECODE having inputs connected with the $Q_0$, $Q_2$, and $Q_4$ outputs of the latch 40. The output of the gate 240 goes low if the BAKE address pad is touched.

Thus, the output of the gate 230 goes low driving one input of the NOR gate 228 low if any address pad requiring a digit entry is touched. The other input to the gate 228 is from the output of an AND gate 242 having one input connected with the group signal output $G_s$ of the encoder 62 and the other input connected with the OFF address pad through an OR gate 244. The OFF address pad input to the gate 244 is AND'ed in the gate 244 with the 15 pulses per second output of the clock generator 52, and OR'ed with the $G_s$ output of the encoder 62 in the gate 242. Thus, the output of the AND gate 242 goes low causing the output of the gate 228 to go high and the output of the gate 226 to go low and trigger the digit one-shot 120 any time a digit address pad is touched following the touching of an instruction address pad requiring a digit entry. The digit one-shot 120 is repeatedly triggered from the 15 pulse per second output of the clock generator 52 through the gate 244 whenever the OFF address pad is touched subsequent to the touching of an instruction address pad requiring a digit entry.

The aforementioned gating 220 (FIG. 7) interconnecting the digit one-shot 120 with the clock input of the shift register 78 and the WRITE ENABLE input of the memory 72 includes an AND gate 246 which causes the shift register 78 to be clocked each time the digit one-shot 120 is triggered. The gate 246 has one input connected with the Q output of the one-shot 120. The output input to the gate 246 is normally held high by the untouched CLOCK and TIMER address pads through AND gate 248, OR gate 250, and OR gate 252. The gating 220 further includes an AND gate 254 and an OR gate 256 which causes the memory one-shot 222 to be triggered each time the digit one-shot 120 is triggered unless a surface unit address pad has been touched. The other input to the gate 254 is normally held high by the gate 250. The other input to the gate 256 is the output of the gate 140 so that if a surface unit address pad is touched the trigger input to the memory one-shot 222 remains high during the entry of a digit and therefore does not enable the WRITE ENABLE input of the memory 72. This preserves the data located in the "00" address of the memory 72.

As previously mentioned, when it is desired to turn off a surface unit element, the BROIL element or the BAKE element, the appropriate address pad is first touched and then the OFF address pad is touched which causes the digit one-shot 120 to be repeatedly toggled from the 15 PPS output of the clock generator 52 thereby causing all "0's" to be entered into the particular memory location selected. This results from the fact that the BCD input to shift register 78 is 0000 and the repeated toggling of the digit one-shot 120 causes this data to be entered. This also places all "0's" in the appropriate latches 82a–82c, or 84a–84d, or 85a–85d, or 58a–58d depending upon which of the surface units or cooking address pads were touched just prior to touching the OFF address pad.

CLOCK AND TIMER DISPLAY AND CONTROL LOGIC

When the instruction latch 48 is in its cleared or reset condition, which is normally the case, the location in the memory 72 being addressed is "00". Under these conditions touching of the CLOCK or TIMER address pads directly places shift register 78 in its parallel entry mode to permit the time of day stored in the time of day generator 96 or the time remaining in the minute timer generator 100 to be loaded into the shift register 78 and written into the memory 72 to display to the user the present time of day or the time remaining since the last entry into the minute timer 100. The parallel entry and display is accomplished by the following logic of FIG. 8. The parallel enable input PE of the register 78 is normally held high through an OR gate 258 from the $\overline{Q}_1$ output of the latch 260. As long as the parallel enable input PE is held high the shift register 78 operates in its serial mode. The D1 input to the latch 260 is normally low, it being obtained from the normally high output of a NAND gate 262 through an inverter 264. The NAND gate 262 is designated CLOCK or TIMER SET and has inputs connected to the $Q_4$ output of the latch 48 and to the $Q_1$ and $Q_2$ outputs thereof through inverters 26 and 268. The other input to the gate 258 is normally held low by the low input to an AND gate 270 from the inverter 264. The $Q_1$ and $Q_2$ outputs of the memory address latch 208 are both normally low and are applied to the inputs of an OR gate 271 so that its output is low and provides a low input to an OR gate 273. The other input to the OR gate 273 is from the panel disable switch 110 and is low as long as the panel is enabled. Accordingly, the input to OR gate 250 from the gate 273 is low. The other input to the gate 250 is from the output of the AND gate 248 having inputs connected directly to the TIMER and CLOCK address pads. Since the output of the gate 248 is normally high, the output of the gate 250 is normally high and provides the other input to AND gate 270. When either the TIMER or CLOCK address pads are touched the outputs of the gates 248 and 250 go low to release the OR gate 252. When the instruction one-shot 112 switches to its unstable state as a result of touching either the TIMER or CLOCK address pads, the code entered into the instruction latch 48 causes the output of the gate 262 to go low and the D1 input of the latch 260 and one input to the gate 270 to go high. The instruction one-shot 112 also clocks the latch 260 through the gate 214 so that the $Q_1$ output of the latch 260 goes high and the $\overline{Q}_1$ output of the latch 260 goes low. As long as the TIMER or CLOCK address pads are being touched the output of the gate 250 and thus the output of the gate 270 is low so that when the D1 input of the latch 260 switches high and the $\overline{Q}_1$ output of the latch 260 switches low the output of the gate 258 goes low to enable the parallel enable input on the register 78. When the instruction one-shot 112 returns to its stable state its $\overline{Q}$ output goes high clocking the register 78 through the gates 252 and 246 to thereby enter into the register 78 the data contained in the time of day generator 96 or the minute timer 100 depending on whether the TIMER or CLOCK address pad was touched. In addition, while the TIMER or CLOCK address pads are being touched the trigger input to the memory one-shot 222 is switched low through the gates 248, 250, 254, and 256 to trigger the memory one-shot 222 and enable the WRITE ENABLE input to the memory 72 so that the data entered into the shift register 78 is written into the memory 72.

The data entered into the shift register 78 depends upon the position of the multiplexer 104 which is controlled from the CLOCK address pad. The select input on each of the multiplexer elements 104a–104d is connected with the $Q_3$ output of the latch 260. The $D_3$ input to the latch 260 is from the output of an AND gate 272 designated CLOCK LOAD having one input connected to the output of the inverter 264 and the other input connected to $Q_0$ of the instruction latch 48. If the CLOCK address pad is touched the $Q_3$ output of the latch 260 goes high to select data from the time of day generator 96 for entry into the register 78. If the TIMER address pad is touched the $Q_3$ output of the latch 260 will go low to select data from the minute timer generator 100 for entry into the shift register 78. Whenever the TIMER or CLOCK address pads are touched the $Q_2$ output of the latch 260 goes high to drive the colon display 76e (FIG. 7) between the second and third digit displays. The $D_2$ input to the latch 260 is from the aforementioned gate 232 through an inverter 274. When the instruction one-shot 112 reverts to its stable state its $\overline{Q}$ output goes low to store the data at the $D_1$, $D_2$, and $D_3$ inputs in the latch 260 so that they are retained at the $Q_1$, $Q_2$, and $Q_3$ outputs respectively. When the CLOCK or TIMER address pads are released the output of the gates 248, 250, and 270 and 258 go high to disable the parallel entry to the shift register 78 so that if the user desires to enter new information it is entered into the shift register 78 from the Time and Temperature Setting keyboard in a serial fashion.

If no new data is to be entered into the shift register 78 the data in the shift register 78 is reentered into the time of day generator 96 or minute timer generator 100 when the 8 second timer 50 times out. This is accomplished as follows: The enable input on the time of day generator 96 is connected to the output of a NAND gate 276 having one input connected to the output of the AND gate 272 and the other input connected to the 8 second timer 50 through an OR gate 278 and an inverter 280. The load input on the minute timer generator 100 is connected with the output of a NAND gate 282 having one input connected with the output of an AND gate 284 designated TIMER LOAD and the other input connected to the output of the OR gate 278. The gate 284 has one input connected to the $Q_0$ output of the instruction latch 48 through an inverter 286 and the other input connected to the inverter 264. If the CLOCK address pad is selected the output of the gate 272 goes high and if the TIMER address pad is selected the output of the gate 284 goes high to respectively enable the NAND gates 276 or 282. When the 8 second timer 50 times out the output of the gate 278 goes high so that the output of either the gate 276 or 282 goes low to enable either the time of day generator 96 or the minute timer generator 100 depending upon which had previously been selected. When the 8 second timer 50 times out the instruction latch 48 is cleared causing the $Q_4$ input to the gate 262 to go low and the output of the gate 262 to go high. This provides a low input to the AND gate 270 to once again enable the register 78 for parallel entry of data. The $Q_1$ output of the latch 260 remains high and when the output of the gate 262 goes high both inputs to an AND gate 288 are high enabling a NAND gate 290. The other input to the NAND gate 290 is from the one pulse per minute output of the clock generator 52. The digit one-shot 120 is accordingly triggered at one minute intervals through an inverter 292 and the NOR gate 226 to thereby clock the shift register 78 and enable the write input to the memory 72. Thus, the time of day or time remaining in the minute timer generator 100 is continuously displayed to the user (except for the short interval of time when the write enable input to the memory 72 is enabled) and is continuously updated at 1 minute intervals.

If on the other hand, new data is to be entered into the time of day generator 96 or minute timer generator 100, the appropriate one of the two generators 96 or 100 is enabled for data entry from the output of NOR gate 228 through the OR gate 278 and the appropriate NAND gate 276 or 282 each time a digit address pad is touched to cause the $G_s$ input to the gate 242 from the encoder 62 to go low. Thus, once the CLOCK or TIMER address pad has been touched the time of day or time remaining in the minute timer generator 100 is continuously displayed and updated until a different instruction address pad in the oven control area of the panel 16 is touched, at which time the $D_1$ input to the latch 260 goes low and is stored at the output thereof as a result of the triggering of the instruction one-shot 112 to thereby disable the gate 288.

Figure 9:
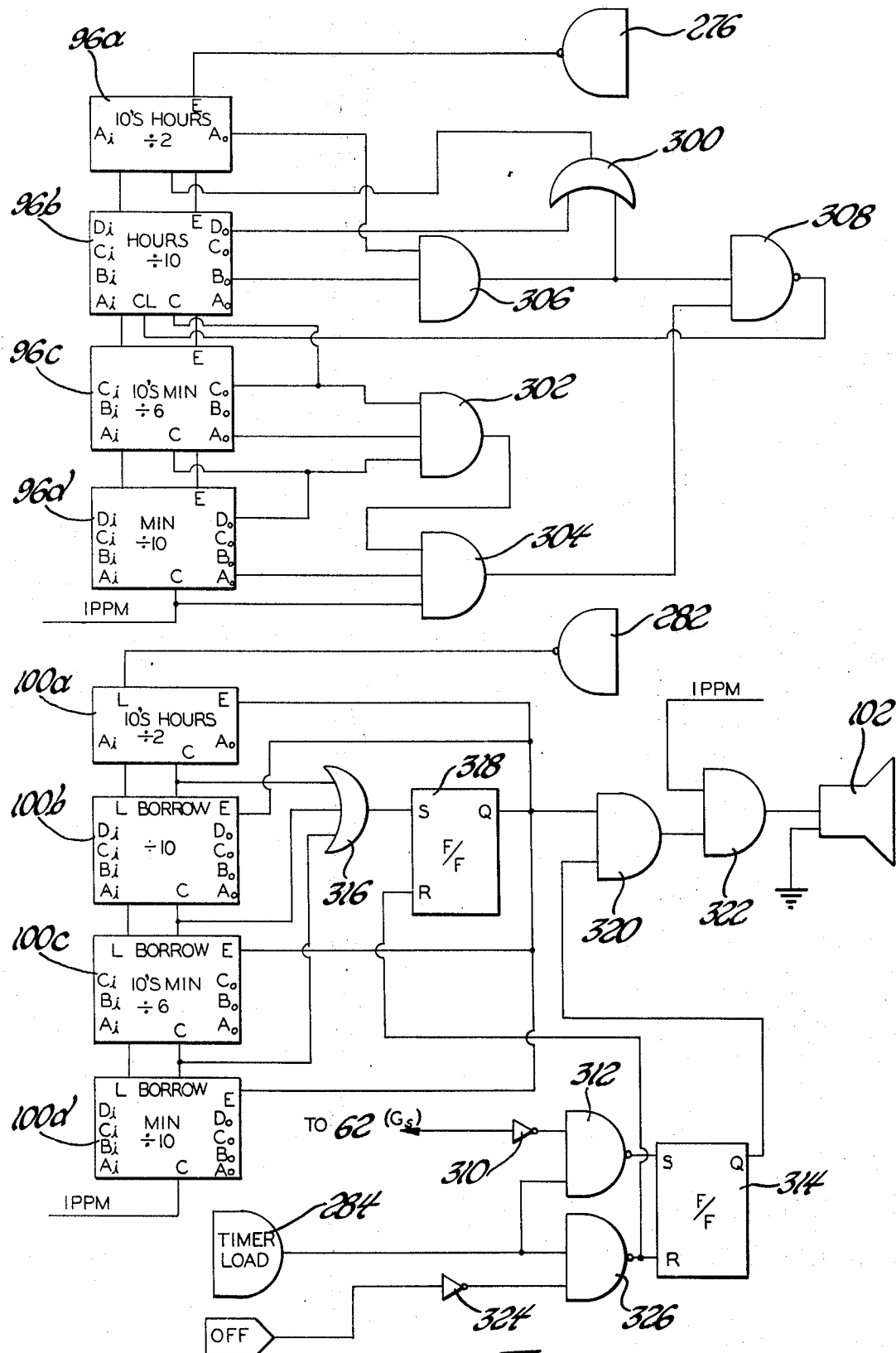

Referring now to FIG. 9, the time of day generator 96 comprises divide-by-two counter 96a for storing the tens of hours, divide-by-ten counter 96b for storing the hours, divide-by-six counter 96c for storing the tens of minutes, and divide-by-ten counter 96d for storing minutes. The counter 96d is incremented from the one pulse per minute output of the clock generator 52. When the counter 96d stores 9 minutes, its $A_0$ and $D_0$ outputs are high and on the succeeding clock pulse the $D_0$ output goes low to clock the counter 96c. When the counter 96c stores 5 minutes its $A_0$ and $C_0$ outputs are high and on the next clock pulse the $C_0$ output goes low to clock the counter 96b. The counter 96a is clocked from the $D_0$ output of the counter 96b through an OR gate 300 on the first pulse following storage of 9:59 in the counters 96b, 96c, and 96d.

AND gates 302 and 304 are interconnected with the counters 96c and 96d so that the gate 304 goes high when the counters 96c and 96d store 59 minutes. AND gate 306 is interconnected with the counters 96a and 96b so that its output goes high when the counters 96a and 96d store 12 hours. The outputs of the gates 302 and 304 provide inputs to a NAND gate 308 having its output connected with the CLEAR input to the counter 96b. The output of the gate 306 also provides one input to the OR gate 300. When the counters 96a–96d store the time 12:59, both inputs to the gate 308 are high so that the counter 96b is cleared. When the counter 96b clears, the output of the gate 306 goes low to clock the counter 96a from a 1 to a 0. On the next negative going clock input to the counter 96d the former 12:59 storage in the counters 96a–96d is clocked to 1:00.

TIMER BUZZER CONTROL

The minute timer 100 is similar in construction to the time of day generator 96 and comprises divide-by-two counter 100a for storing tens of hours, divide-by-ten counter 100b for storing hours, divide-by-six counter 100c for storing tens of minutes and divide-by-ten counter 100d for storing minutes. The counters 100a–100d are decremented from the one pulse per minute output of the clock generator 52.

When a digit is entered subsequent to touching the TIMER address pad the low going $G_s$ output of the encoder 62 is inverted by an inverter 310 so that both input to a NAND gate 312 are high and its output goes low to set a flip-flop 314 causing its Q output to go high. After the time loaded into the timer 100 has elapsed all inputs to an OR gate 316 will be low and its output will go low to set a flip-flop 318 and drive its Q output high. When the Q output of the flip-flop 318 goes high both inputs to an AND gate 320 are high and the output of an AND gate 322 goes high at one second intervals to periodically energize the buzzer 102. At the same time the high going Q output of the flip-flop 318 disables the timer 100 so that the timer 100 can no longer be clocked. To turn the buzzer 102 off the user touches the TIMER address pad and the OFF address pad in sequence. When the TIMER address pad is touched the output of gate 284 goes high. The normally high output of the OFF address pad goes low upon touching the OFF address pad and is inverted by inverter 324 so that both inputs to a NAND gate 326 are high and its output goes low to reset the flip-flops 314 and 318 thereby disabling the gates 320 and 322 and the buzzer 102. When the flip-flop 318 is reset the timer 100 is once agan enabled for data entry.

CONTROL LOGIC FOR BAKE, BROIL, AND CLEAN OVEN FUNCTIONS

Figure 10:
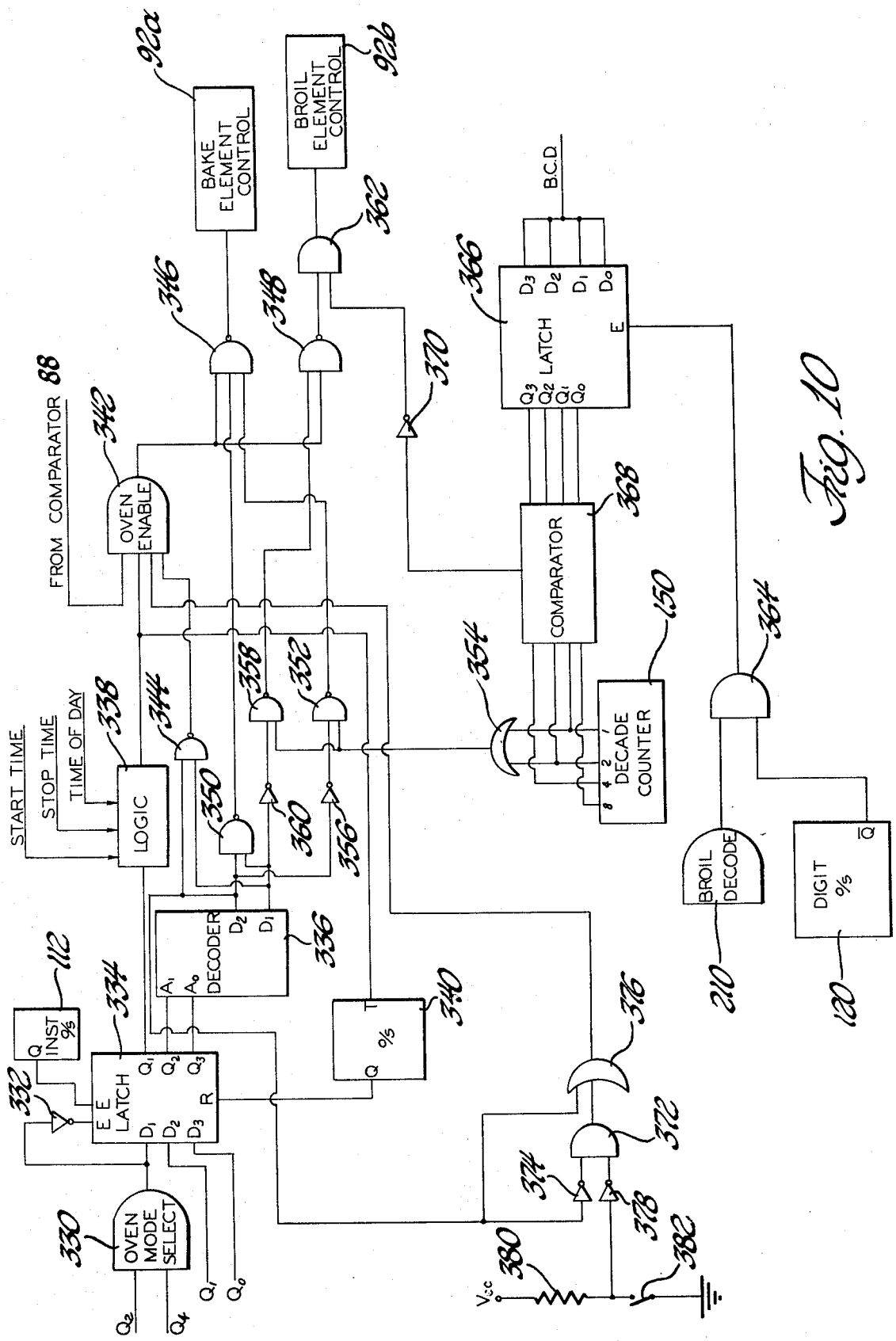

Referring now to FIG. 10, an AND gate 330 has inputs connected with the $Q_2$ and $Q_4$ outputs of the instruction latch 48. The output of the gate 330 is connected through an inverter 332 to one of the enable inputs of a latch 334. The other enable input to the latch 334 is connected with the Q output of the instruction one-shot 112. The $D_1$ input to the latch 334 is connected with the output of the gate 330 while the $D_2$ and $D_3$ inputs to the latch 334 are connected with the $Q_1$ and $Q_0$ outputs of the latch 48. Data enters the latch 334 when both enable inputs are low. As long as this logic condition exists the $Q_1$, $Q_2$, and $Q_3$ outputs of the latch 334 will follow the $D_1$, $D_2$, and $D_3$ inputs. If either of the enable inputs go high the data present in the latch 334 at that time is held in the latch and is no longer affected by the data inputs. The master reset input to the latch 334 is designated R and when this input goes low the outputs $Q_1$, $Q_2$, and $Q_3$ of the latch 334 are forced low. The gate 330 is designated OVEN MODE SELECT and its inputs are both high when either the BROIL, BAKE, or CLEAN address pads are touched. When the instruction one-shot 112 returns to its stable state its Q output goes from low to high so that both enable inputs to the latch 334 will be low if either the BAKE, BROIL, or CLEAN address pads are touched to store a logic 1 at the $Q_1$ output of the latch 334. If BAKE, BROIL, or CLEAN is selected the $Q_2$ and $Q_3$ outputs will be respectively 01, 00, or 10. The $Q_2$ and $Q_3$ outputs of the latch 334 are connected with the $A_1$ and $A_0$ inputs respectively of a one-of-four decoder 336. The $D_1$ and $D_2$ outputs of the decoder 336 are normally high and remain high if BROIL is selected. The $D_1$ output of the decoder 336 goes low if BAKE is selected and the $D_2$ output of the decoder 336 goes low if CLEAN is selected. The $Q_1$ output of the latch 334 is connected with logic generally designated 338 which is also provided with inputs relating to START TIME, STOP TIME, and TIME OF DAY. The logic 338 will be described in detail hereinafter. The output of the logic 338 is normally low and goes high when the START TIME equals the TIME OF DAY and returns low when the STOP TIME equals the TIME OF DAY. The output of the logic 338 triggers a one-shot multivibrator 340 to reset the latch 334 when the STOP TIME equals the TIME OF DAY. The output of the logic 338 also provides one input to an AND gate 342 designated OVEN ENABLE. Another input to the gate 342 is from the comparator 88 (FIG. 4) and is high whenever the oven temperature is less than the set temperature. The third input to the gate 342 is from a NAND gate 344 having inputs connected with the $D_1$ and $D_2$ outputs of the decoder 336. Thus, the gate 342 is disabled by the gate 344 whenever BROIL is selected and is only enabled for the BAKE or CLEAN operations. The output of the gate 342 provides an input to NAND gates 346 and 348. A second input to the gate 346 is from the output of a NAND gate 350 having inputs connected with the $D_1$ and $D_2$ outputs of the decoder 336. A third input to the gate 346 is from the output of a NAND gate 352 having inputs connected with the two least significant bits of the output of the decade counter 150 through an OR gate 354 and the $D_2$ output of the decoder 336 through an inverter 356. The other input to the gate 348 is from the output of a NAND gate 358 having one input connected to the $D_1$ output of the decoder 336 through an inverter 360 and its other input connected with the decade counter 150 through an OR gate 354.

When the oven is programmed for the BAKE operation, the $D_1$ output of the decoder 336 goes low and the output of the gates 344 and 350 go high. The $D_2$ output of the decoder 336 is high so that the input to the gate 352 from the inverter 356 is low and the output of the gate 352 is high. The output of the inverter 360 is high so that both inputs to the gate 358 will be high when either of the two least significant bits of the counter 150 are high which occurs 70% of the time. The output of the gate 358 accordingly goes low and the output of the gate 348 goes high for 70% of the time. The remaining 30% of the time the output of the gate 358 is high. When the START TIME for the BAKE operation equals the time of day, the output of the logic 338 goes high and the output of the gate 342 goes high as long as the temperature in the oven is less than the desired temperature thereby enabling the gates 346 and 348. The output of the gate 346 goes low to energize the BAKE element control 92a and the output of the gate 348 goes low to energize the BROIL element control 92b through an AND gate 362 for 30% of the time. Thus, as long as the $D_1$ output of the decoder 336 is low and the START TIME for oven operation has been reached and the oven temperature is below the desired temperature the BAKE element will be energized continuously through the control 92a while the BROIL element will be energized 30% of the time through the control 92b.

If the BROIL operation is selected the output of the AND gate 210 will go high. The output of the gate 210 provides one input to an AND gate 364, the other input of which is connected with the $\overline{Q}$ output of the digit one-shot 120. The BROIL operation is implemented in the same fashion as a surface unit operation and requires entry of only a single digit to select the proper BROIL temperature. When the digit is entered the $\overline{Q}$ output of the digit one-shot 120 goes high to enable a four bit latch 366 so that the BCD equivalent of the digit is entered and appears at the $Q_0$–$Q_3$ outputs thereof. When the one-shot 120 returns to its stable state the data is stored in the latch 366. The output of the latch 366 is compared with the output of the decade counter 150 in a comparator 368. The output of the comparator provides a second input to the AND gate 362 through an inverter 370. The input to the gate 362 from the inverter 370 is low to energize the BROIL element through the control 92b as long as the output of the decade counter 150 is less than the output of the latch 366. The BROIL element is therefore energized a percentage of time depending on the digit entry.

The percentage energization of the BAKE and BROIL elements during the CLEAN cycle is the reverse of the BAKE cycle with the BROIL element being energized by the control 92b 100% of the time and the BAKE element being energized by the control 92a 30% of the time. The CLEAN cycle is similar to the BAKE cycle in that a STOP time must be entered and if the CLEAN cycle is to be delayed a START time must also be entered. However, unlike the BAKE operation it is not necessary to enter an operating temperature since a 920° F. entry will be forced upon touching the CLEAN address pad as will be detailed hereinafter. In addition, the oven door must be manually locked before the CLEAN cycle can take place. To this end, the $D_2$ output of the decoder 336 provides one input to an AND gate 372 through an inverter 374 and also provides one input to an OR gate 376 the output of which provides one input to the AND gate 342. The other input to the gate 376 is from the gate 372 which has one input connected through an inverter 378 to the junction between a pull-up resistor 380, connected to $V_{cc}$, and a switch 382 which closes whenever the over door is manually locked. Accordingly, if the CLEAN cycle is selected the output of the gate 376 goes high to enable the gate 342 only if the oven door is latched.

Figure 11:
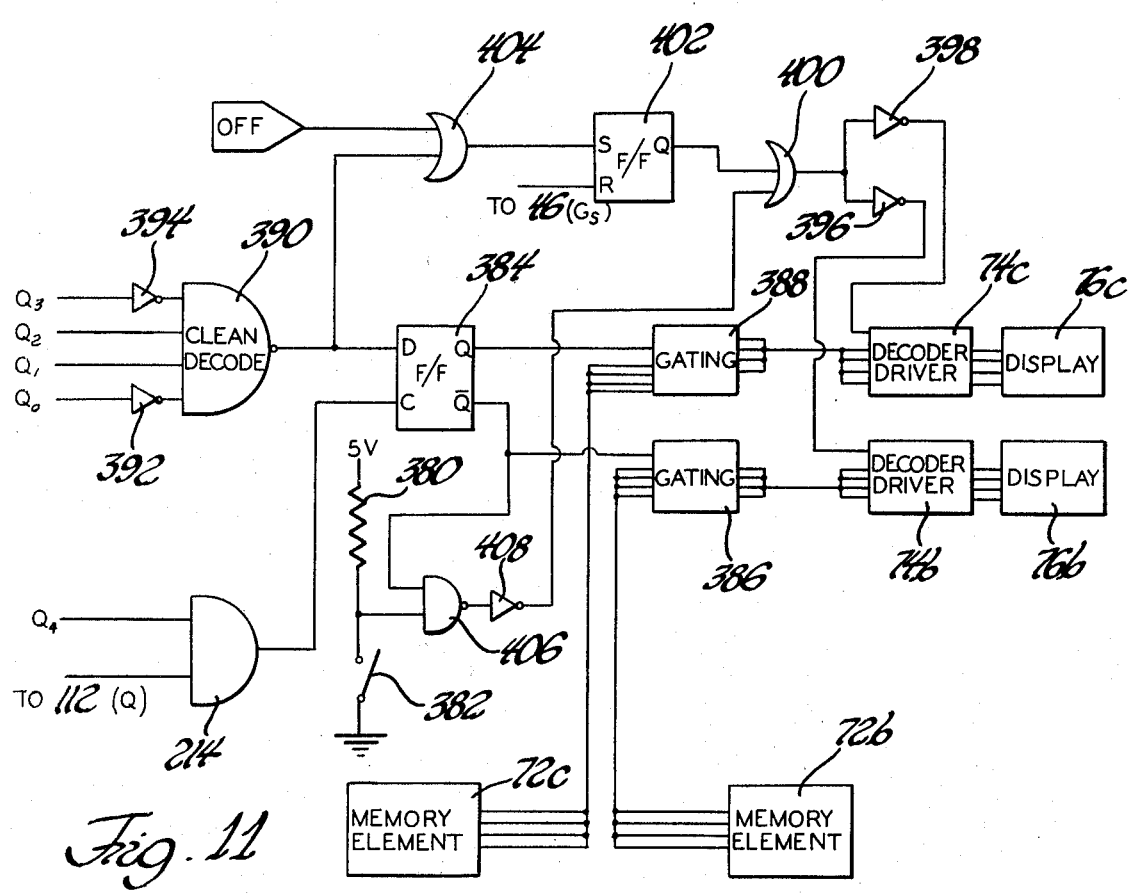
Figure 12:
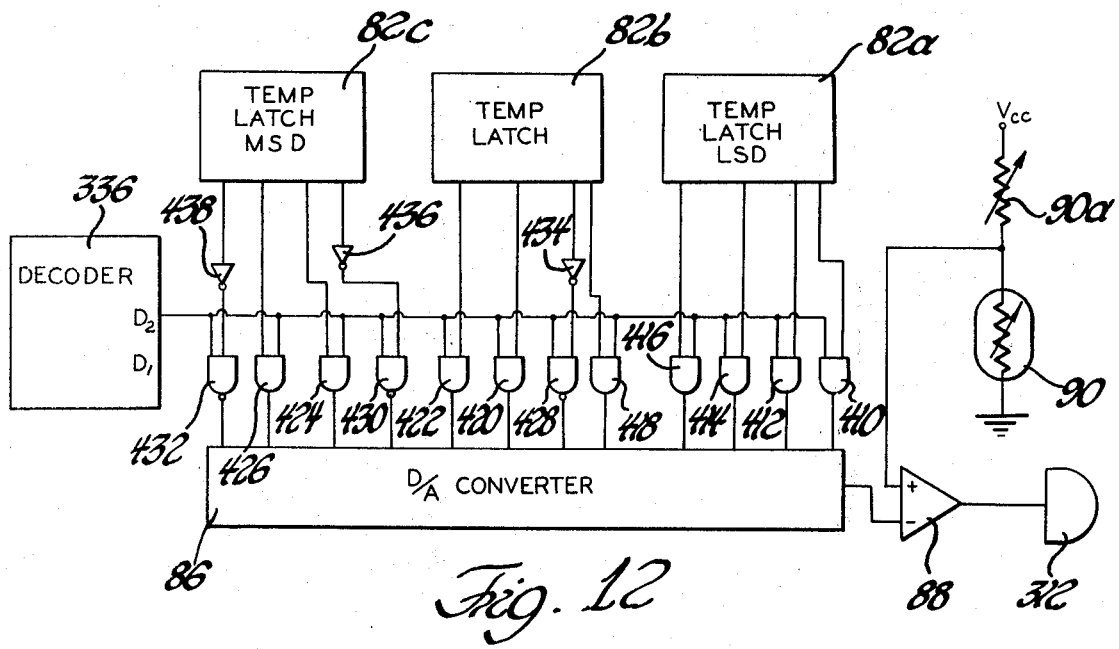

During the CLEAN cycle the characters "EC" are displayed on the displays 76b and 76c. As shown in FIG. 11, this is accomplished by a latch 384 and gating 386 and 388 interconnected between the memory elements 72b and 72c and decode driver 74b, 74c. The Q and $\overline{Q}$ outputs of the latch 384 are normally high and low respectively so that normally the output of the memory elements 72b and 72c pass through the gating 386 and 388 to the decode drivers 74b and 74c respectively. When the CLEAN address pad is touched the output of a NAND gate 390 designated CLEAN DECODE, having inputs connected with the $Q_1$ and $Q_2$ outputs of the latch 48 and the $Q_0$ and $Q_3$ outputs of the latch 48 through inverters 392 and 394, goes high and is clocked to the Q output of the latch 384 by the instruction one-shot 112 through the gate 214. Accordingly, the Q and $\overline{Q}$ outputs of the latch 384 are switched to low and high respectively forcing the output of the gating 388 to the code for the character "E" and forcing the output of the gating 386 to the code for the character "C" which are then decoded by the decode driver 74b and 74c and displayed on the display 76b and 76c. The characters "EC" may be blanked out by touching the CLEAN and OFF address pads in sequence. This is accomplished by connecting the blanking input to the decode drivers 74b and 74c through inverters 396 and 398 respectively, and an OR gate 400 to the Q output of a flip-flop 402. The flip-flop 402 is reset from the $G_s$ output of the encoder 46 and is set through an OR gate 404. The characters "EC" may also be blanked out by opening the oven door. Though not shown, the door locking mechanism includes means responsive to the oven temperature which maintains the oven door in a locked condition until the temperature therein has dropped below a predetermined temperature. Once this occurs the door may be manually unlocked opening the switch 382 so that both inputs to a NAND gate 406 are high providing a low output which is inverted by inverter 408 to provide a low at the blanking input to the decode drivers 74b and 74c to blank the characters "EC".

As previously mentioned, whenever the CLEAN cycle is entered the temperature input is forced to 920° F. This is accomplished by the logic shown in FIG. 12. The temperature latches 82a–82c are connected with the D/A converter 86 through gating comprising AND gates 410–426 and NAND gates 428–432. The next least significant bit output from the latch 82b, and the least and most significant bit outputs of the latch 82c are inverted by inverters 434, 436, and 438 respectively, so that in the absence of the CLEAN cycle the data stored in the latches 82a–82c passes through the gates 410–432 without any modification thereof. The other input to each of the gates 412–432 is from the $D_2$ output of the decoder 336. When the CLEAN cycle is entered the $D_2$ output of the decoder 336 goes low so that the least significant digit of the temperature entry is forced to "0", the next most significant digit entry is forced to "2", and the next most significant digit entry is forced to "9". The output of the converter 86 is connected with the negative input of the comparator 86 while the positive input of the comparator 86 is connected to the junction between the oven temperature sensor 90 and an oven calibrating resistor 90a connected with $V_{cc}$.

Figure 13:
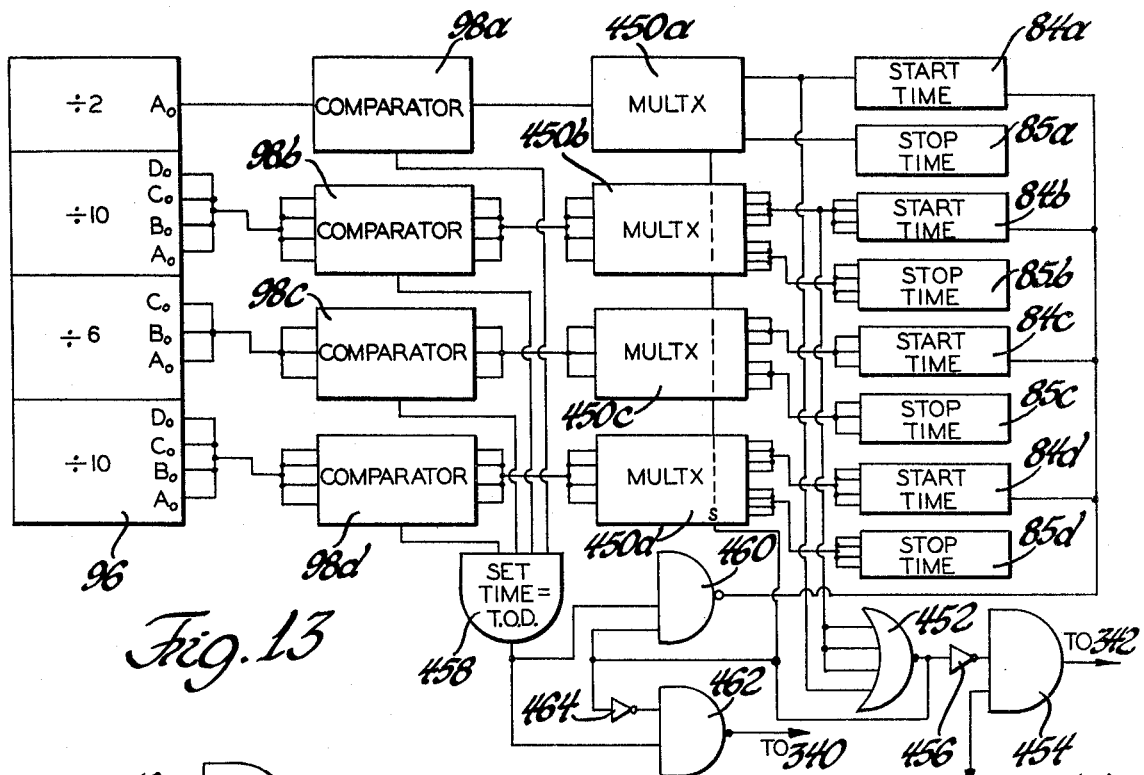

Referring now to FIG. 13, the logic 338 (FIG. 10) for carrying out an automatic BAKE or CLEAN operation is shown in more detail. The data in the time of day generator 96 is compared in comparator elements 98a–98d with either the START TIME stored in the latches 84a–84d or the STOP TIME stored in the latches 85a–85d depending on the selected state of multiplex elements 450a–450d. The individual multiplex elements 450a–450d have their select inputs S connected with the output of an OR gate 452. When the output of the gate 452 is high the data in the START TIME latches 84a–84d is compared with the data in the time of day generator 96 in the comparators 98a–98d. On the other hand, when the output of the gate 452 is low the data in the STOP TIME latches 85a–85d are compared with the data in the time of day generator 96 in the comparators 98a–98d. The gate 452 has its inputs connected with the outputs of the START TIME latches 84a and 84b so that if a START TIME has been entered at least one input to the gate 452 will be high and its output will be high to switch data from the START TIME latches 84a–84d to the comparators 98a–98d. If no START TIME has been entered, all inputs to the gate 452 will be low and its output will be low to switch data from the STOP TIME latches 85a–85d to the comparators 98a–98d. The output of the gate 452 also provides one input to an AND gate 454 through an inverter 456. The other input to the gate 454 is from the $Q_1$ output of the latch 334 (FIG. 10) and the output of the gate 454 provides one input to the OVEN ENABLE gate 342, (FIG. 10). The output of each of the comparators 98a–98d provides one input to an AND gate 458 designated SET TIME = TIME OF DAY. The output of the gate 458 provides one input to NAND gates 460 and 462. The other input to the gate 460 is from the gate 452 while the other input to the gate 462 is from the gate 452 through an inverter 464. The output of the gate 460 is connected with the reset input of each of the START TIME latches 84a–84d.

The operation of the automatic BAKE cycle is as follows: Since an oven mode of operation has been selected the $Q_1$ output of the latch 334 will be high and if no START TIME has been entered, i.e. the BAKE operation is to begin immediately, all inputs to the gate 452 will be low and its output will be low so that the output of the gate 454 goes high and the BAKE element is energized 100% of the time by the control 92b. On the other hand, if a START TIME has been entered, the output of the gate 452 will be high and switch the data in the START TIME latches 88a–88d to the comparators 84a–84d and disable the gate 454. When the time of day is equal to the START TIME the output of the gate 458 goes high so that both inputs to the gate 460 will be high driving its output low to reset the START TIME latches 84a–84d. When the START TIME latches 84a–84d are reset all inputs to the gate 452 go low and its output goes low to enable the gate 454 to begin the BAKE cycle and to select data from the STOP TIME latches 85a–85d for comparison with the data in the time of day generator 96 in the comparators 98a–98d. When the stop time equals the time of day, the output of the gate 458 goes high so that both inputs to gate 462 are high and the output of the gate 462 goes low to trigger the one-shot 340 (FIG. 10) which resets the latch 334 so that its $Q_1$ output is low disabling the gate 454 and terminating the automatic BAKE cycle. The automatic CLEAN cycle is implemented in the same way as the automatic BAKE cycle.

Figure 14:
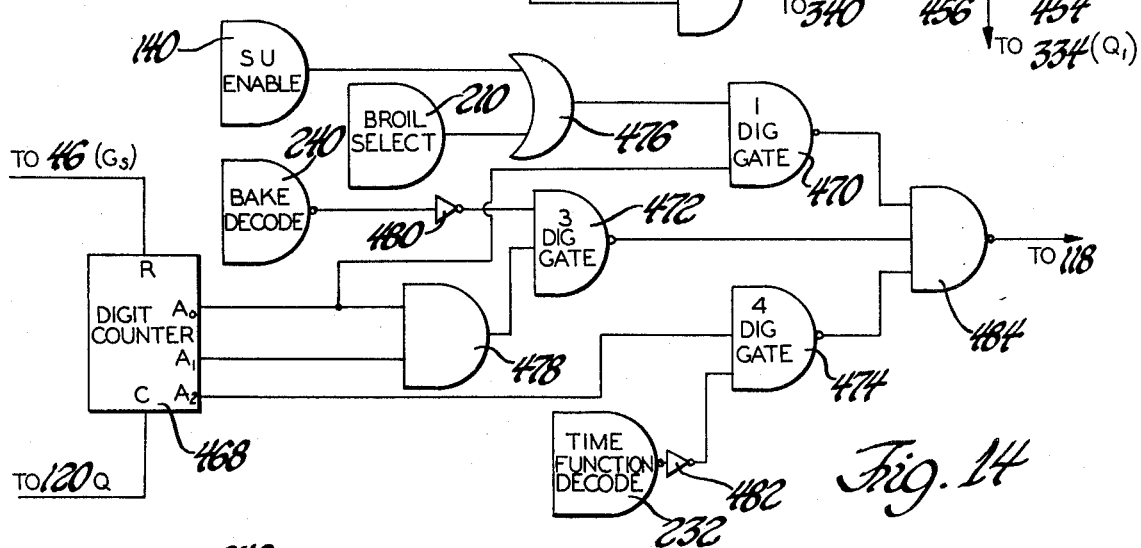

Referring now to FIG. 14, the digit entry limiter 60 (FIG. 4) comprises a digit counter 468, a NAND gate 470 designated 1 digit gate, a NAND gate 472 designated 3 digit gate, and a NAND gate 474 designated 4 digit gate. The outputs of the digit counter 468 designated $A_0$, $A_1$, and $A_2$ provide the BCD equivalent of the number of digit address pads touched by the user subsequent to touching of an instruction address pad. To this end, the digit counter 468 is reset from the $G_s$ output of the encoder 46 and is clocked from the Q output of the digit one-shot 120. A single digit entry causes the output $A_0$ to go high, a three digit entry causes the output $A_0$ and $A_1$ to go high, and a four digit entry causes the output $A_2$ to go high. If either a surface unit address pad or the Broil address pad is touched, the gate 470 is enabled through an OR gate 476 so that upon entry of a single digit the output of the gate 470 goes low. The $A_0$ and $A_1$ outputs of the counter 468 are applied to the gate 472 through an AND gate 478. The output of the gate 240 is inverted by an inverter 480 so that if the BAKE address pad is touched both inputs to the gate 472 will be high upon entry of the third digit of the BAKE temperature and the output of the gate 472 will go low. The output of the gate 232 is applied to the gate 474 through an inverter 482 so that if any time function address pad such as START TIME, STOP TIME, CLOCK, or TIMER are touched, both inputs to the gate 474 will be high upon entry of the fourth digit causing the output of the gate 474 to go low. The gates 470, 472, and 474 provide inputs to an AND gate 484 which provides an input to the AND gate 118 (FIG. 5). Accordingly, the instruction latch 48 is cleared after the appropriate number of digits have been entered depending upon the function address pad touched prior to entry of the digits.

Figure 15:
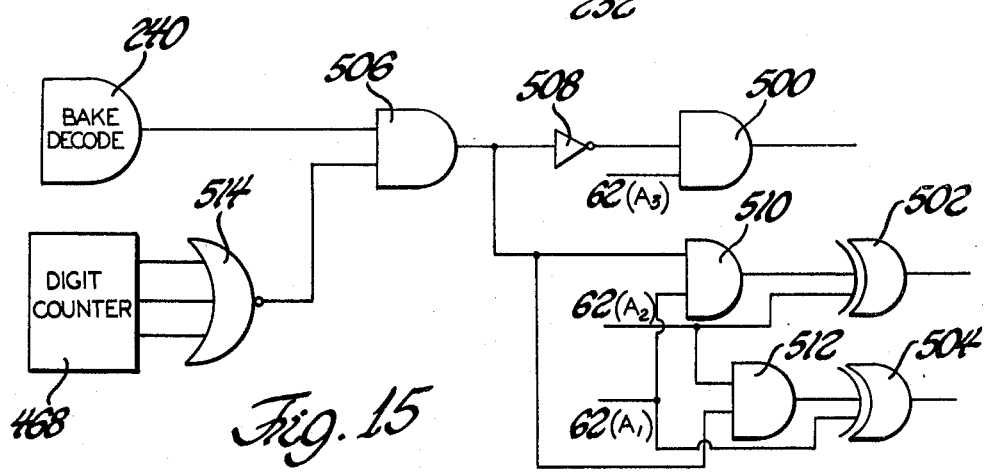

The temperature entry for the BAKE cycle is limited to a maximum of 599°F. by the data masking logic shown in FIG. 15. The logic includes an AND gate 500 and EXCLUSIVE OR gates 502 and 504. The $A_3$, $A_2$, and $A_1$ outputs of the encoder 62 provide one input to the gates 500, 502, and 504 respectively. The other input to the gate 500 is from an AND gate 506 through an inverter 508. The other input to the gate 502 is from an AND gate 510 having inputs connected with the output of the gate 506 and the $A_1$ output of the encoder 62. The other input to the gate 504 is from an AND gate 512 having inputs connected with the gate 506 and the $A_2$ output of the encoder 62. The gate 506 has one input connected with the BAKE DECODE logic gate 240 while its other input is connected with the digit counter 468 through a NOR gate 514. When the BAKE address pad is touched the output of the gate 240 goes high and the digit counter 468 is reset from the $G_s$ output of the encoder 46 so that all outputs of the digit counter 468 are low and the outputs of the gates 514 and 506 are high, and the gate 500 is disabled so that regardless of the digit entry by the operator, the most significant bit of the digit will be "0". Furthermore, the next two most significant bits of the most significant digit cannot be "11" or the outputs of the gate 510 and 512 will be high and the outputs of the EXCLUSIVE OR gate 502 and 504 will be low. By masking the three most significant bits of the most significant digit, a temperature entry for the BAKE operation is limited to an upper temperature of 599° F. After the first digit is entered the digit counter 468 is clocked by the digit one-shot 120 to disable the gate 506 so that the outputs of the gate 500, 502, and 504 follow the $A_1$, $A_2$, and $A_3$ outputs of the encoder 62 for any subsequent digit entry. Since the least significant bit of the most significant digit is entered into the memory 72 and displayed to the user, the user will be aware of the inaccurate entry, i.e. if the digits 6 or 8 is the first digit touched the display will show a "0", and if the digits 7 or 9 are the first digit touched, the display will show a "1". This inaccurate entry may be erased by touching the BAKE address pad and the OFF address pad in sequence.

Referring now to FIG. 16, the control logic for the present invention is preferably implemented in several metal oxide semiconductor integrated circuit chips collectively designated 520. In FIG. 16, the rear of the tempered glass touch panel 16 is shown. A black ceramic paint is applied to the rear of the transparent glass panel 16, leaving openings for the displays which are mounted on a printed circuit board (not shown).

The conductive drive pads, i.e. pad 34 of FIG. 3a segregated into three separate groups designated A, B, and C, and the conductive sense pads, i.e. pad 36 of FIG. 3a, are segregated into eight groups designated 1–8 and are applied to the black ceramic paint surface. The printed circuit board provides terminals for applying a drive signal to the A, B, and C drive pads and for sensing the signal at the sense pads 1–8. A tin oxide coating is applied to the front surface and portions are etched away to segregate the address pads and to provide the legends as designated in FIG. 16.

The displays designated A, B, C, D, E, F, G, and H are neon gas discharge devices that use seven segments to form the desired number from 0–9 and are located on the printed circuit board in a relationship to the panel 16 as shown in the display diagram of FIG. 16a. The desired symbol is formed by application of a DC voltage between the anode and the appropriate cathode segments of the display. Selection of the proper display segments is controlled by a decoder driver 522 which is shared by each of the displays A–H. The decoder driver 522 receives BCD data from the BCD1, BCD2, BCD4, and BCD8 outputs of the MOS control logic 520. The decoder driver 522 also receives a blanking input BLK from the logic 520. The drive voltage for both the touch panel 16, the MOS control logic 520 and the displays A–H is provided from a regulated power supply 524 connected between the L2 and neutral lines of the domestic power supply. The power supply 524 provides 200 volts DC to drive the anode of each of the displays A–H through anode switching transistors 526a–526h. The transistors 526a–526h are turned on in sequence from the MOS control logic 520 through resistors 528a–528h and coupling capacitors 530a–530h. The touch panel 16 is driven from the switching transistors 526a, 526b, and 526c through the three drive lines designated DRIVE LINE A, DRIVE LINE B, and DRIVE LINE C. A reference voltage of 100 volts DC is maintained at the anodes of the displays A–H by a voltage divider network associated with each active display. The lower leg of the voltage divider for the displays D, E, F, G, and H, i.e. those not associated with DRIVE LINES A, B, and C formed by the parallel combination of resistors 532, 534, and 536 while the upper leg of the voltage divider is provided by resistors 538d, 538e, 538f, 538g, and 538h. The voltage divider network associated with the displays A, B, and C have an upper leg resistor 538a, 538b, and 538c respectively with the lower leg being formed on the parallel combination of two of the three resistors 532, 534, and 536. By appropriate sizing of the resistors 532, 534, 536, and 538a–538h, a 100 volt DC level is maintained at the anode of the display when the display is activated. In order to prevent negative going transients on the DRIVE LINES A, B, and C when the displays A, B, and C are turned off, clamping diodes 540, 542, and 544 are provided between the 100 volt node of the voltage dividers and the anodes of the displays A, B, and C. A filter capacitor 545 is provided between the 100 volt node and ground. The voltage applied to the panel 16 is thus switched between 100 volts and 200 volts. This peak-to-peak voltage of 100 volts is attenuated to voltage levels compatible with the MOS circuit 520 through the series capacitors 32, 34, and 32, 36 (FIG. 3b) formed by the conductive pads 32, 34, and 36 on opposite sides of the 3/16 inch tempered glass panel 16. By driving the panel from the display anodes driver transistors rather than a separate drive system the display system is less likely to interfere with the panel.

The eight sense line inputs to the control logic 520 are designated S1–S8. Other inputs include the input $V_{dd}$ from the −17 volt output of the supply 524 for driving the MOS logic, the input $V_{bb}$ from the −5 volt output of the supply 524 for driving the T²L decoder driver 522 as well as the triacs in the power circuits generally designated 546, the 60 Hz. input through a resistor 548, and the inputs RC1, RC2, and RC3. The input RC1 is tied to the junction between the oven thermistor 90 and a capacitor 550. The thermistor 90 is shunted by resistors 552 and 554. The input RC2 is tied to the junction between a capacitor 556 and resistors 558 and 560. The resistors 554 and 560 are calibration resistors for the CLEAN and BAKE temperature adjustment respectively. The RC3 input is connected to the junction between resistor 562 and capacitor 564 and cooperates with logic in the MOS circuits 520 to form the basic clock oscillator for the system. The control logic 520 includes means cooperating with the RC network connected to the RC2 input which form a reference oscillator and means cooperating with the RC network connected to the RC1 input which form a sense oscillator. The frequency of the sense oscillator changes with temperature changes in the oven and the difference in frequency between the reference and sense oscillators is used to measure the temperature of the oven for controlling the power circuits 546 to the various heater elements. Further details regarding logic for implementing this approach to temperature sensing and control may be found in my copending application Ser. No. 318,012, filed Dec. 26, 1972, and assigned to the assignee of the present invention.

Another input to the control logic 520 designated POR is from a Power On Reset circuit 566 which initializes the various logic elements when power is first applied. In addition to the aforementioned outputs of the control logic 520, an output designated BUZ is connected to the buzzer control circuit 568. An output designated COL controls a switching transistor 570 connected to the CC electrodes of the display D through resistors 572 and 574. The output COL is activated to display the colon whenever time of day is being displayed. The displays include keep alive means including resistors 576 and 578 for displays A, and D and resistors 580 and 582 for the displays B and E. The displays F, G, H, and C are three digit displays and their center electrodes are connected with resistors 584, 586, and 588, 590 respectively to provide the keep alive function for these displays.

Referring now to FIG. 17, exemplary circuitry is disclosed for driving the anode switching transistors 526a–526h and for ascertaining which of the touch pads tied to any one of the eight sense lines has been touched. The circuitry includes an oscillator 600 producing square wave outputs of, for example, 100 KHz. The output of the oscillator 600 is applied to a divide-by-ten counter 601 to provide a 10 KHz. output at a 10% duty cycle. The output of the counter 601 is applied to a second divide-by-ten counter 602, the output of which is applied to a divide-by-eight counter 604. The outputs of the counter 604 advance through the binary equivalents of the digits 1–8 with each ten input pulses to the counter 602 advancing the counter 604 one digit. The outputs of the counter 604 are connected with the $A_0$, $A_1$, and $A_2$ inputs of a one-of-ten decoder 606 through OR gates 608, 610, and 612. The outputs of the counter 606 designated 0–7 correspond to the outputs 0–7 of the control logic 520 (FIG. 16) and are sequentially activated to drive the anode switching transistors 526a–526h respectively. The output of the counter 601 is connected with the $A_3$ input to the decoder 606 and also to the $A_0$, $A_1$, and $A_2$ inputs through the OR gates 608, 610, and 612 and thus drives the decoder 606 to an unused output 10 times during the period of activation of any one of the 0–7 outputs thereby turning off the anode switching transistors 526a–526h nine times each anode switch cycle. Since the turn off time is very short it has no effect on the display being driven but is utilized to provide the high frequency square wave signal on the DRIVE LINES A, B, and C to the touch panel 16. The circuitry of FIG. 17 establishes a criteria for valid data from the touch panel 16 which requires that all pulses after the first two pulses be less than a particular voltage level for a touch pad to be considered as having been touched and furthermore, the data must remain below that level for two consecutive scans of the panel 16. By disregarding the first two pulses, transients resulting from turn on of a display or other circuit instabilities have no significant effect on the data from the panel 16. By requiring that a particular touch pad be touched for two scans of the panel 16 the system is less susceptible to extraneous noise signals.

The output of the counter 601 is also applied to a BCD counter 614 which provides inputs to a one-of-ten decoder 616. The 0 output of the decoder 616 is applied as one input to an AND gate 618 through an inverter 620 to clock four bit shift registers 622 and 624. The Q3 output of the shift register 622 is connected with the J and $\bar{K}$ inputs of the shift register 624 to provide for storage of eight bits of data. The other input to the gate 618 is from a one-of-ten decoder 626 having its $A_0$, $A_1$, and $A_2$ inputs connected with the outputs of the counter 604. The 1, 4, and 7 outputs of the decoder 626 are activated simultaneously with the 1, 4, and 7 outputs of the decoder 606. The 1, 4, and 7 outputs are activated immediately following deactivation of the anode switching transistors 524a, 524b, and 524c. The 1 and 4 outputs of the decoder 626 provide inputs to OR gates 628 and 630 through inverters 632 and 634 respectively. The 7 output of the decoder 626 provides the other input to the OR gate 628 and 630 through an inverter 636. The outputs of the OR gates 628 and 630 provide inputs to an OR gate 638 the output of which provides the other input to the AND gate 618. The 1, 4, and 7 outputs of the decoder 626 are connected with a source of voltage through respective pull up resistors 640, 642, and 644. The output of the OR gate 628 also is connected with the Q input of a flip-flop 646 while the output of the OR gate 630 is connected with the D input of a flip-flop 648. The Q outputs of the flip-flops 646 and 648 are connected to a decoder 649 having outputs designated A, B, and C. The flip-flops 646 and 648 are clocked from the shift registers 622 and 624 through logic comprising AND gates 650 and 652. The AND gate 650 has its inputs connected with the $Q_0$ and $Q_3$ outputs of the shift register 622 while the AND gate 652 is connected with the output of the gate 650 and to the Q2 output of the shift register 624 through inverter 654. The shift register 622 has its J and $\bar{K}$ inputs connected with the $\bar{Q}$ output of a flip-flop 656 which is reset from the 1 output of the decoder 616. The 0 and 1 outputs of the decoder 616 provide inputs to an AND gate 658 and are also connected to a voltage source V through pull up resistors 660 and 662. The output of the gate 658 provides one input to an AND gate 664, the other input of which is designated SENSE DATA. The output of the gate 664 provides one input to an OR gate 666 having its output connected with the D input to the flip-flop 656. The other input to the OR gate 666 is from the Q output of the flip-flop 656. The flip-flop 656 is clocked from the counter 601.

FIG. 18 shows various waveforms in the circuit of FIG. 17 and is helpful in understanding the operation of the circuit in FIG. 17. The SENSE DATA input to the gate 664 from one of the eight sense lines such as for example, sense line S8 connected with pads A8, B8, and C8. During the first two pulses while the 0 output of the decoder 606 is activated, which is the time during which DRIVE LINE A is activated, the gate 658 is disabled because one of the 0 or 1 outputs of the decoder 616 will be low. Thus, in accordance with the aforementioned criteria the gate 658 disables the gate 664 during the first two pulses so that the first two pulses of the SENSE DATA are ignored. Thereafter the output of the gate 664 is high during the time interval that the DRIVE LINES A, B, and C are activated. The $\bar{Q}$ output of the flip-flop 656 is reset high on the second pulse and clocked low on the third pulse during the time intervals when the DRIVE LINES A, B, and C are activated as long as none of the sense lines are touched. On the first pulse following deactivation of the DRIVE LINES A, B, and C the shift registers 622 and 624 are clocked. Accordingly, when the pads are untouched all "0's" are clocked into the shift register 622 and 624 disabling the gate 652 so that the flip-flops 646 and 648 are not clocked and their outputs are at a "0" logic level. If the address pad associated with the pad B8, i.e. STOP TIME, is touched the sense input to the gate 664 remains below the threshold level of the gate 664 during the time DRIVE LINE B is activated so that its input is logic "0" and the $\bar{Q}$ output of the flip-flop 656 will remain logic "1". The logic "1" output of the flip-flop 656 is then clocked to the $Q_0$ output of the shift register 622 on the first pulse following deactivation of DRIVE LINE B. The input to the gate 664 again goes high during the time DRIVE LINE C is activated so that the $\bar{Q}$ output of the flip-flop 656 is clocked low on the third pulse during the time the DRIVE LINE C is activated.

Immediately following deactuation of DRIVE LINE C and prior to resetting of the flip-flop 666 the shift registers 622 and 624 are clocked so that the data in the shift register 622 and 624 is 0100000 as shown beneath the clock input waveform. If the B8 pad remains touched during the second scan of the panel 16 the input to the shift register 622 will be a logic "1" and immediately following termination of DRIVE LINE B the shift registers 622 and 624 will be clocked to store the data 1001000 and the $Q_0$ and $Q_3$ outputs of the shift register 622 will be high while the $Q_2$ output of the shift register 624 will be low and the output of the gate 652 will go high to clock the flip-flops 646 and 648. The input to the flip-flops 646 and 648 from the OR gates 628 and 630 will be "1" and "0" respectively, immediately following termination of DRIVE LINE A, "0" and "1" respectively immediately following termination of the DRIVE LINE B, and "1" and "1" respectively immediately following termination of DRIVE LINE C as shown in the waveforms. If pad B8 has been touched the flip-flops 646 and 648 are clocked to store the code for the B8 touch pad namely, "10" which is applied to the decoder 649 which activates its B output. It will be apparent that if the A8 or C8 touch pads had been touched the A or C outputs respectively of the decoder 649 would be activated.

The criteria satisfied by the circuitry shown in FIG. 17 is preferably implemented by logic in the control logic 520 which permits the eight sense lines to be multiplexed to a single detector circuit. The outputs of the various storage elements in the logic 520 are multiplexed to the decoder driver 522 so that the data relating to any one of the various range functions is presented to the decoder driver 522 at the time the appropriate display is being driven. In addition to the range functions described relative to the embodiment of FIGS. 1–15, the embodiment of FIG. 16 includes a SURFACE TIMER address pad which permits automation turn off of a surface unit after a selected interval of time. This function is implemented in a fashion similar to the TIMER function but rather than sounding a buzzer at the expiration of the time interval, all "0's" are loaded into the appropriate surface unit latch in a manner similar to actuation of the OFF address pad.

Having thus described my invention what I claim is:

1. A digital control and display panel for use in the control console of a domestic appliance adapted to be connected to a domestic power supply for household operation, said panel comprising a pane of strengthened planar glass adapted to be coextensive with said control console and imperforate throughout for easy wipe cleanability and a printed circuit board located at the rear side of said glass pane, said printed circuit board supporting a plurality of display means and digital logic means, said glass pane having an opaque paint surface of nonconductive material on the rear side thereof defining a transparent area in front of each of said display means so a user may view said display means, and touch control means for programming said appliance, said touch control means including a plurality of conductive address pads on the front side of said glass pane respectively identifiable with said plurality of display means and with each address pad having an associated conductive drive pad and conductive sense pad applied to said paint surface on the rear side of said glass pane, said digital logic means implemented in at least one monolithic integrated circuit chip and responsive to the user's touch of an address pad for enabling a respective one of said display means to display a program entry as a visual feedback to the user.

2. The digital control and display panel of claim 1 wherein said printed circuit board includes terminals for applying a drive signal to the drive pads and for sensing the signal at the sense pad in response to a user's touch of one of said address pads.

3. The digital control and display panel of claim 2 wherein said address pads are formed of tin oxide.

4. A digital control and display panel for use in a control console of a domestic appliance adapted to be connected to a domestic power supply for household operation, said panel comprising a pane of planar dielectric material adapted to be coextensive with said control console and imperforate throughout for easy wipe cleanability and a printed circuit board located at the rear side of said pane, said printed circuit board supporting display means and digital logic means, said pane having an opaque paint surface of nonconductive material on the rear side thereof defining a transparent area in front of said display means so a user may view said display means, and touch control means for programming said appliance, said touch control means including a plurality of conductive address pads on the front side of said pane, each address pad having an associated conductive drive pad and conductive sense pad applied to said paint surface on the rear side of said pane, said digital logic means being responsive to the user's touch of an address pad for enabling said display means to display program entries as a visual feedback to the user, means for electrically interconnecting the sense pads in a plurality of groups, each group containing a plurality of pads, means electrically interconnecting the drive pads in a plurality of groups each group containing a plurality of pads, drive means for applying a pulsating drive signal of predetermined magnitude and pulse rate to each of said groups of drive pads in a predetermined timed sequence, said digital logic means including means responsive to the signal at each of said groups of sense pads for detecting which address pad has been touched.

5. A digital control and display panel for use in a control console of a domestic appliance adapted to be connected to a domestic power supply for household operation, said panel comprising a pane of planar dielectric material adapted to be coextensive with said control console and imperforate throughout for easy wipe cleanability and a printed circuit board located at the rear side of said pane, said printed circuit board supporting display means and digital logic means, said pane having an opaque paint surface of nonconductive material on the rear side thereof defining a transparent area in front of said display means so a user may view said display means, means including said pane forming touch control means for programming said appliance, said touch control means further including a plurality of spaced function address pads of electrically conductive material and a plurality of digit address pads of electrically conductive material, each address pad affixed to the user's side of said panel, a drive pad of electrically conductive material and a sense pad of electrically conductive material associated with each of said plurality of address pads and affixed to said opaque paint surface, conductor means affixed to said opaque paint surface for electrically interconnecting the drive pads in a plurality of groups each group containing a plurality of drive pads, and for electrically interconnecting the sense pads in a plurality of groups, each group containing a plurality of sense pads, said display means including a plurality of display elements, means adapted to be connected with said domestic power supply for providing a regulated source of DC voltage, switch means for connecting said groups of drive pads and said display elements to said DC source, said digital logic means including means for applying a drive signal of predetermined pulse rate to said plurality of switch means in a predetermined time sequence, said digital logic means further including detector means responsive to the signal at each of said groups of sense pads for detecting which of the several address pads associated with a group of sense pads has been touched, said detector means including means establishing a criteria for valid input data from said panel which requires that data indicative of a touched address pad be present for at least two successive applications of said DC voltage to the group of drive pads associated with a touched address pad.

6. A digital control and display panel for use in a control console of a domestic appliance adapted to be connected to a domestic power supply for household operation, said appliance including an operating element, said panel comprising a pane of strengthened planar glass adapted to be coextensive with said control console and imperforate throughout for easy wipe cleanability and a printed circuit board located at the rear side of said glass pane, said printed circuit board supporting display means and digital logic means, said glass pane having an opaque paint surface of nonconductive material on the rear side thereof defining a transparent area in front of said display means so a user may view said display means, and touch control means for programming said appliance, said touch control means including a plurality of conductive address pads on the user's side of said panel and user touchable for programming said operating element for timed operation, each address pad having an associated conductive drive pad and conductive sense pad applied to said paint surface on the rear side of said glass pane, said digital logic means responsive to the user's touch of said address pad for permitting said operating element to be connected to said power supply for the operating time entered by the user and for enabling said display means to display the time remaining in the operation as a visual feedback to the user.

7. The digital control and display panel of claim 6 including means to display time of day on said display means and wherein said digital logic means includes means responsive to said user's touch of said address pad for disabling the display of time of day so that said display means can display said time remaining.

* * * * *

UNITED STATES PATENT AND TRADEMARK OFFICE
CERTIFICATE OF CORRECTION

PATENT NO. : 3,974,472
DATED : August 10, 1976
INVENTOR(S) : Robert R. Gould, Jr.

It is certified that error appears in the above-identified patent and that said Letters Patent are hereby corrected as shown below:

Column 3, line 26, "decial" should read -- decimal --.

Column 8, line 58, "output" should read -- other --.

Column 9, line 44, the numeral "26" should read the numeral -- 266 --.

Column 12, line 6, "couunter" should read -- counter --.

Column 14, line 47 "whih" should read -- which --.

Column 16, line 30, the numeral "92b" should read the numeral -- 92a --.

Column 16, line 31, before "On the other hand," insert -- and the BROIL element is energized 30% of the time by the control 92b. --.

Column 18, line 44, after "C" insert -- is --.

Signed and Sealed this

Second Day of November 1976

[SEAL]

Attest:

RUTH C. MASON
Attesting Officer

C. MARSHALL DANN
Commissioner of Patents and Trademarks